United States Patent
Recio et al.

(10) Patent No.: US 7,103,626 B1
(45) Date of Patent: Sep. 5, 2006

(54) PARTITIONING IN DISTRIBUTED COMPUTER SYSTEM

(75) Inventors: Renato J. Recio, Austin, TX (US); Joe P. Cowan, Fort Collins, CO (US); Dwight L. Barron, Houston, TX (US); Gregory F. Pfister, Austin, TX (US); Mark W. Bradley, Boulder, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

(21) Appl. No.: 09/980,757

(22) PCT Filed: May 24, 2000

(86) PCT No.: PCT/US00/14491

§ 371 (c)(1),
(2), (4) Date: May 17, 2002

(87) PCT Pub. No.: WO00/72142

PCT Pub. Date: Nov. 30, 2000

(51) Int. Cl.
*G06F 15/177* (2006.01)

(52) U.S. Cl. ...................... 709/201; 709/220
(58) Field of Classification Search ................ 709/201, 709/220
See application file for complete search history.

(56) References Cited

U.S. PATENT DOCUMENTS

| | | | |
|---|---|---|---|
| 4,475,192 A | 10/1984 | Fernow et al. | |
| 5,297,143 A | 3/1994 | Fridrich et al. | |
| 5,408,465 A | 4/1995 | Gusella et al. | |
| 5,506,964 A | 4/1996 | Beukema | |
| 5,699,500 A | 12/1997 | Dasgupta | |
| 5,781,910 A | 7/1998 | Gostanian et al. | |
| 5,790,544 A | 8/1998 | Aho et al. | |
| 5,799,146 A | 8/1998 | Badovinatz et al. | |
| 5,802,295 A | 9/1998 | Fukui et al. | |
| 5,916,307 A | 6/1999 | Piskiel et al. | |
| 5,926,101 A | 7/1999 | Dasgupta | |
| 5,987,506 A | 11/1999 | Carter et al. | |
| 5,999,964 A | 12/1999 | Murakata et al. | |
| 6,047,323 A | 4/2000 | Krause | |
| 6,070,219 A | 5/2000 | McAlpine et al. | |
| 6,088,736 A | 7/2000 | Manning et al. | |
| 6,157,647 A * | 12/2000 | Husak ..................... | 370/401 |
| 6,339,595 B1 * | 1/2002 | Rekhter et al. ............ | 370/392 |
| 6,704,766 B1 * | 3/2004 | Goss et al. ................. | 718/104 |
| 6,725,284 B1 * | 4/2004 | Arndt ........................ | 710/5 |

OTHER PUBLICATIONS

A copy of the PCT International Search Report mailed Oct. 3, 2000, for International Application No. PCT/US00/14491 (6 pages).

* cited by examiner

*Primary Examiner*—Dung Dinh

(57) ABSTRACT

A distributed computer system includes a first subnet including a first group of endnodes, each endnode in the first group of endnodes having a unique destination location identification (DLID) within the first subnet. A second subnet in the distributed computer system includes a second group of endnodes, each endnode in the second group of endnodes having a unique DLID within the second subnet. A communication fabric is physically coupled to the first group of endnodes and the second group of endnodes. A partitioning mechanism associates a first partition key to every DLID in the first subnet for enabling communication between the first group of endnodes over the communication fabric. The partitioning mechanism associates a second partition key to every DLID in the second subnet for enabling communication between the second group of endnodes over the communication fabric.

27 Claims, 13 Drawing Sheets

PARTITIONING IN DISTRIBUTED COMPUTER SYSTEM

THE FIELD OF THE INVENTION

The present invention generally relates to communication in computers systems and more particularly to partitioning distributed computer systems to permit communication between remote endnodes in the distributed computer system.

BACKGROUND OF THE INVENTION

A traditional computer system has an implicit ability to communicate between its own local processors and from the local processors to its own I/O adapters and the devices attached to its I/O adapters. Traditionally, processors communicate with other processors, memory, and other devices via processor-memory buses. I/O adapters communicate via buses attached to processor-memory buses. The processors and I/O adapters on a first computer system are typically not directly accessible to other processors and I/O adapters located on a second computer system.

For reasons stated above and for other reasons presented in greater detail in the description of the preferred embodiments section of the present specification, there is a need for an improved partitioning mechanism in distributed computer systems to permit efficient direct accessibility by processors and I/O adapters on a first computer system to other processors and I/O adapters located on a second computer system.

SUMMARY OF THE INVENTION

The present invention provides a distributed computer system including a first subnet and a second subnet. The first subnet includes a first group of endnodes. Each endnode in the first group of endnodes has a unique destination location identification (DLID) within the first subnet. The second subnet includes a second group of endnodes. Each endnode in the second group of endnodes has a unique DLID within the second subnet. A communication fabric is physically coupled to the first group of endnodes and the second group of endnodes. A partitioning mechanism associates a first partition key to every DLID in the first subnet for enabling communication between the first group of endnodes over the communication fabric. The partitioning mechanism associates a second partition key to every DLID in the second subnet for enabling communication between the second group of endnodes over the communication fabric.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention is directed to a partitioning mechanism in distributed computer systems which allow logical association of two endnodes with one another to allow the endnodes to communicate directly with one another in the distributed computer system.

Figure 1:
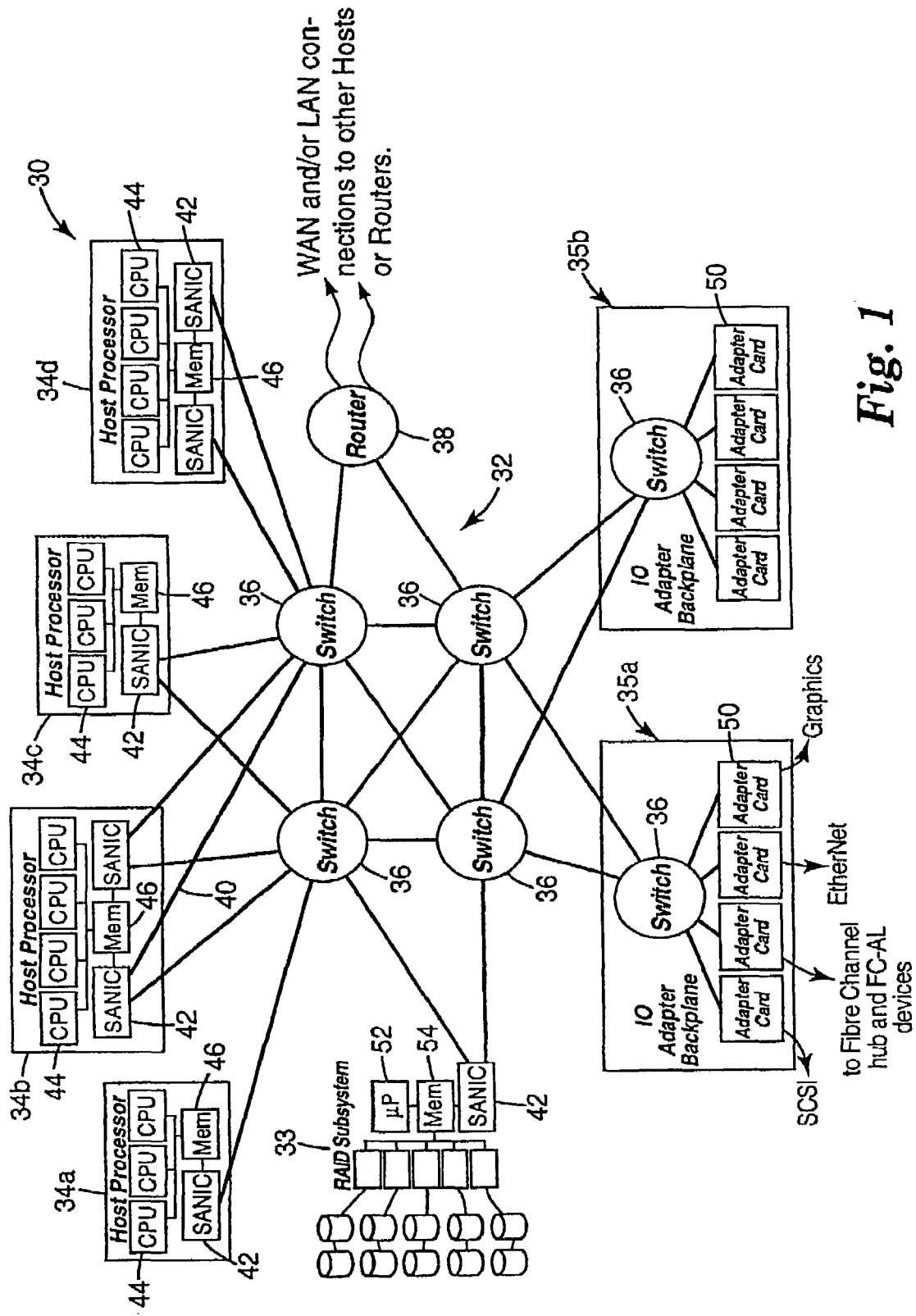
FIG. 1 is a diagram of a distributed computer system for implementing the present invention.

An example embodiment of a distributed computer system is illustrated generally at 30 in FIG. 1. Distributed computer system 30 is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

Distributed computer system 30 includes a system area network (SAN) 32 which is a high-bandwidth, low-latency network interconnecting nodes within distributed computer system 30. A node is herein defined to be any device attached to one or more links of a network and forming the origin and/or destination of messages within the network. In the example distributed computer system 30, nodes include host processors 34a–34d; redundant array independent disk (RAID) subsystem 33; and I/O adapters 35a and 35b. The nodes illustrated in FIG. 1 are for illustrative purposes only, as SAN 32 can connect any number and any type of independent processor nodes, I/O adapter nodes, and I/O device nodes. Any one of the nodes can function as an endnode, which is herein defined to be a device that originates or finally consumes messages or frames in the distributed computer system.

A message is herein defined to be an application-defined unit of data exchange, which is a primitive unit of communication between cooperating sequential processes. A frame is herein defined to be one unit of data encapsulated by a physical network protocol header and/or trailer. The header generally provides control and routing information for directing the frame through SAN 32. The trailer generally contains control and cyclic redundancy check (CRC) data for ensuring packets are not delivered with corrupted contents.

SAN 32 is the communications and management infrastructure supporting both I/O and interprocess communication (IPC) within distributed computer system 30. SAN 32 includes a switched communications fabric (SAN FABRIC) allowing many devices to concurrently transfer data with high-bandwidth and low latency in a secure, remotely managed environment. Endnodes can communicate over multiple ports and utilize multiple paths through the SAN fabric. The multiple ports and paths through SAN 32 can be employed for fault tolerance and increased bandwidth data transfers.

SAN 32 includes switches 36 and routers 38. A switch is herein defined to be a device that connects multiple links 40 together and allows routing of frames from one link 40 to another link 40 within a subnet using a small header destination ID field. A router is herein defined to be a device that connects multiple links 40 together and is capable of routing frames from one link 40 in a first subnet to another link 40 in a second subnet using a large header destination address or source address.

In one embodiment, a link 40 is a full duplex channel between any two network fabric elements, such as endnodes, switches 36, or routers 38. Example suitable links 40 include, but are not limited to, copper cables, optical cables, and printed circuit copper traces on backplanes and printed circuit boards.

Endnodes, such as host processor endnodes 34 and I/O adapter endnodes 35, generate request frames and return acknowledgment frames. By contrast, switches 36 and routers 38 do not generate and consume frames. Switches 36 and routers 38 simply pass frames along. In the case of switches 36, the frames are passed along unmodified. For routers 38, the network header is modified slightly when the frame is routed. Endnodes, switches 36, and routers 38 are collectively referred to as end stations.

In distributed computer system 30, host processor nodes 34a–34d and RAID subsystem node 33 include at least one system area network interface controller (SANIC) 42. In one embodiment, each SANIC 42 is an endpoint that implements the SAN 32 interface in sufficient detail to source or sink frames transmitted on the SAN fabric. The SANICs 42 provide an interface to the host processors and I/O devices. In one embodiment the SANIC is implemented in hardware. In this SANIC hardware implementation, the SANIC hardware offloads much of CPU and I/O adapter communication overhead. This hardware implementation of the SANIC also permits multiple concurrent communications over a switched network without the traditional overhead associated with communicating protocols. In one embodiment, SAN 32 provides the I/O and IPC clients of distributed computer system 30 zero processor-copy data transfers without involving the operating system kernel process, and employs hardware to provide reliable, fault tolerant communications.

As indicated in FIG. 1, router 38 is coupled to wide area network (WAN) and/or local area network (LAN) connections to other hosts or other routers 38.

The host processors 34a–34d include central processing units (CPUs) 44 and memory 46.

I/O adapters 35a and 35b include an I/O adapter backplane 48 and multiple I/O adapter cards 50. Example adapter cards 50 illustrated in FIG. 1 include an SCSI adapter card; an adapter card to fiber channel hub and FC-AL devices; an Ethernet adapter card; and a graphics adapter card. Any known type of adapter card can be implemented. I/O adapters 35a and 35b also include a switch 36 in the I/O adapter backplane 48 to couple the adapter cards 50 to the SAN 32 fabric.

RAID subsystem 33 includes a microprocessor 52, memory 54, read/write circuitry 56, and multiple redundant storage disks 58.

SAN 32 handles data communications for I/O and IPC in distributed computer system 30. SAN 32 supports high-bandwidth and scalability required for I/O and also supports the extremely low latency and low CPU overhead required for IPC. User clients can bypass the operating system kernel process and directly access network communication hardware, such as SANICs 42 which enable efficient message passing protocols. SAN 32 is suited to current computing models and is a building block for new forms of I/O and computer cluster communication. SAN 32 allows I/O adapter nodes to communicate among themselves or communicate with any or all of the processor nodes in distributed computer system 30. With an I/O adapter attached to SAN 32, the resulting I/O adapter node has substantially the same communication capability as any processor node in distributed computer system 30.

Channel and Memory Semantics

In one embodiment, SAN 32 supports channel semantics and memory semantics. Channel semantics is sometimes referred to as send/receive or push communication operations, and is the type of communications employed in a traditional I/O channel where a source device pushes data and a destination device determines the final destination of the data. In channel semantics, the frame transmitted from a source process specifies a destination processes' communication port, but does not specify where in the destination processes memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved with the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for I/O and IPC. A typical I/O operation employs a combination of channel and memory semantics.

In an illustrative example I/O operation of distributed computer system 30, host processor 34a initiates an I/O operation by using channel semantics to send a disk write command to I/O adapter 35b. I/O adapter 35b examines the command and uses memory semantics to read the data buffer directly from the memory space of host processor 34a. After the data buffer is read, I/O adapter 35b employs channel semantics to push an I/O completion message back to host processor 34a.

In one embodiment, distributed computer system 30 performs operations that employ virtual addresses and virtual memory protection mechanisms to ensure correct and proper access to all memory. In one embodiment, applications running in distributed computed system 30 are not required to use physical addressing for any operations.

Queue Pairs

Figure 2:
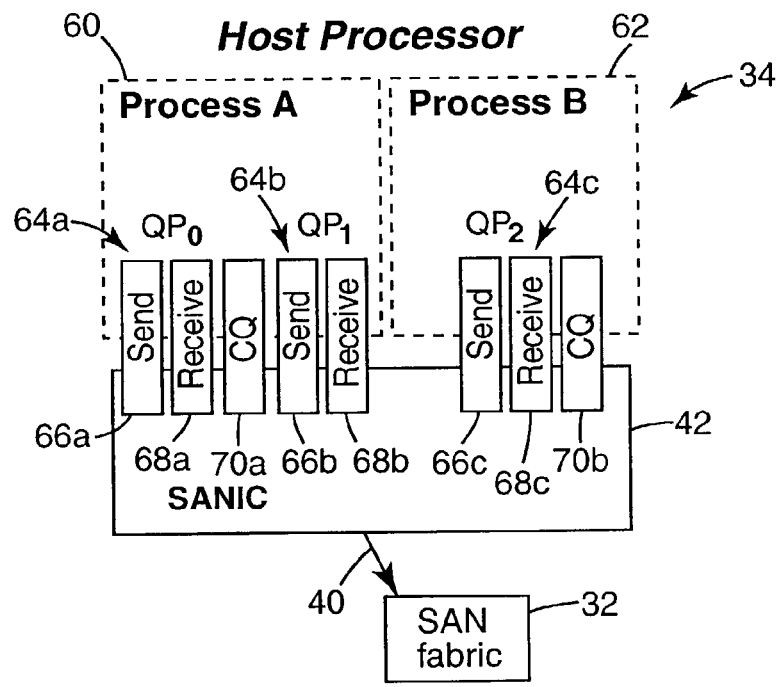
FIG. 2 is a diagram of an example host processor node for the computer system of FIG. 1.

An example host processor node 34 is generally illustrated in FIG. 2. Host processor node 34 includes a process A indicated at 60 and a process B indicated at 62. Host processor node 34 includes SANIC 42. Host processor node 34 also includes queue pairs (QP's) 64a and 64b which provide communication between process 60 and SANIC 42. Host processor node 34 also includes QP 64c which provides communication between process 62 and SANIC 42. A single SANIC, such as SANIC 42 in a host processor 34, can support thousands of QPs. By contrast, a SAN interface in an I/O adapter 35 typically supports less than ten QPs.

Each QP 64 includes a send work queue 66 and a receive work queue 68. A process, such as processes 60 and 62, calls an operating-system specific programming interface which is herein referred to as verbs, which place work items, referred to as work queue elements (WQEs) onto a QP 64. A WQE is executed by hardware in SANIC 42. SANIC 42 is coupled to SAN 32 via physical link 40. Send work queue 66 contains WQEs that describe data to be transmitted on the SAN 32 fabric. Receive work queue 68 contains WQEs that describe where to place incoming data from the SAN 32 fabric.

Host processor node 34 also includes completion queue 70a interfacing with process 60 and completion queue 70b interfacing with process 62. The completion queues 70 contain information about completed WQEs. The completion queues are employed to create a single point of completion notification for multiple QPs. A completion queue entry is a data structure on a completion queue 70 that describes a completed WQE. The completion queue entry contains sufficient information to determine the QP that holds the completed WQE. A completion queue context is a block of information that contains pointers to, length, and other information needed to manage the individual completion queues.

Example WQEs include work items that initiate data communications employing channel semantics or memory semantics; work items that are instructions to hardware in SANIC 42 to set or alter remote memory access protections; and work items to delay the execution of subsequent WQEs posted in the same send work queue 66.

More specifically, example WQEs supported for send work queues 66 are as follows. A send buffer WQE is a channel semantic operation to push a local buffer to a remote QP's receive buffer. The send buffer WQE includes a gather list to combine several virtual contiguous local buffers into a single message that is pushed to a remote QP's receive buffer. The local buffer virtual addresses are in the address space of the process that created the local QP.

A remote direct memory access (RDMA) read WQE provides a memory semantic operation to read a virtually contiguous buffer on a remote node. The RDMA read WQE reads a virtually contiguous buffer on a remote endnode and writes the data to a virtually contiguous local memory buffer. Similar to the send buffer WQE, the local buffer for the RDMA read WQE is in the address space of the process that created the local QP. The remote buffer is in the virtual address space of the process owning the remote QP targeted by the RDMA read WQE.

A RDMA write WQE provides a memory semantic operation to write a virtually contiguous buffer on a remote node. The RDMA write WQE contains a scatter list of locally virtually contiguous buffers and the virtual address of the remote buffer into which the local buffers are written.

A RDMA FetchOp WQE provides a memory semantic operation to perform an atomic operation on a remote word. The RDMA FetchOp WQE is a combined RDMA read, modify, and RDMA write operation. The RDMA FetchOp WQE can support several read-modify-write operations, such as Compare and Swap if equal.

A bind/unbind remote access key (RKey) WQE provides a command to SANIC hardware to modify the association of a RKey with a local virtually contiguous buffer. The RKey is part of each RDMA access and is used to validate that the remote process has permitted access to the buffer.

A delay WQE provides a command to SANIC hardware to delay processing of the QP's WQEs for a specific time interval. The delay WQE permits a process to meter the flow of operations into the SAN fabric.

In one embodiment, receive queues 68 only support one type of WQE, which is referred to as a receive buffer WQE. The receive buffer WQE provides a channel semantic operation describing a local buffer into which incoming send messages are written. The receive buffer WQE includes a scatter list describing several virtually contiguous local buffers. An incoming send message is written to these buffers. The buffer virtual addresses are in the address space of the process that created the local QP.

For IPC, a user-mode software process transfers data through QPs 64 directly from where the buffer resides in memory. In one embodiment, the transfer through the QPs bypasses the operating system and consumes few host instruction cycles. QPs 64 permit zero processor-copy data transfer with no operating system kernel involvement. The zero processor-copy data transfer provides for efficient support of high-bandwidth and low-latency communication.

Transport Services

When a QP 64 is created, the QP is set to provide a selected type of transport service. In one embodiment, a distributed computer system implementing the present invention supports four types of transport services.

Figure 3:
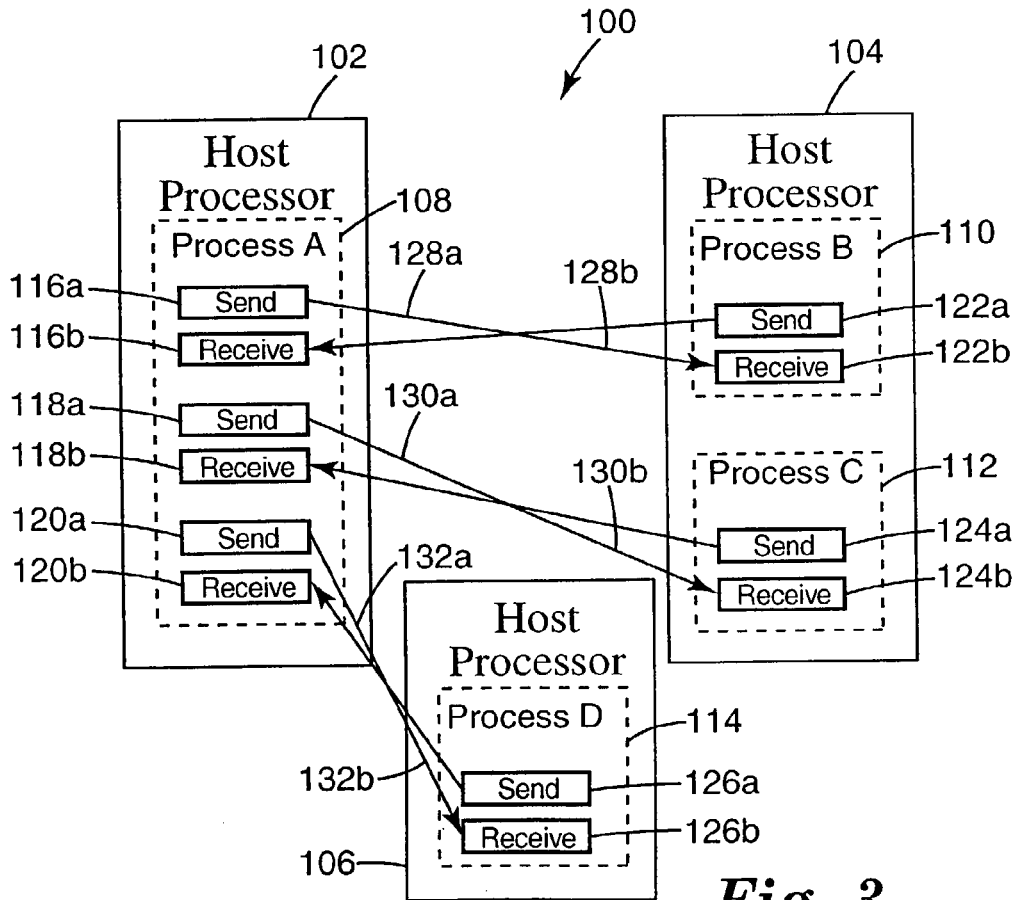
FIG. 3 is a diagram of a portion of a distributed computer system employing a reliable connection service to communicate between distributed processes.

A portion of a distributed computer system employing a reliable connection service to communicate between distributed processes is illustrated generally at 100 in FIG. 3. Distributed computer system 100 includes a host processor node 102, a host processor node 104, and a host processor node 106. Host processor node 102 includes a process A indicated at 108. Host processor node 104 includes a process B indicated at 110 and a process C indicated at 112. Host processor node 106 includes a process D indicated at 114.

Host processor node 102 includes a QP 116 having a send work queue 116a and a receive work queue 116b; a QP 118 having a send work queue 118a and receive work queue 118b; and a QP 120 having a send work queue 120a and a receive work queue 120b which facilitate communication to and from process A indicated at 108. Host processor node 104 includes a QP 122 having a send work queue 122a and receive work queue 122b for facilitating communication to and from process B indicated at 110. Host processor node 104 includes a QP 124 having a send work queue 124a and receive work queue 124b for facilitating communication to and from process C indicated at 112. Host processor node 106 includes a QP 126 having a send work queue 126a and receive work queue 126b for facilitating communication to and from process D indicated at 114.

The reliable connection service of distributed computer system 100 associates a local QP with one and only one remote QP. Thus, QP 116 is connected to QP 122 via a non-sharable resource connection 128 having a non-sharable resource connection 128a from send work queue 116a to receive work queue 122b and a non-sharable resource connection 128b from send work queue 122a to receive work queue 116b. QP 118 is connected to QP 124 via a non-sharable resource connection 130 having a non-sharable resource connection 130a from send work queue 118a to receive work queue 124b and a non-sharable resource connection 130b from send work queue 124a to receive work queue 118b. QP 120 is connected to QP 126 via a non-sharable resource connection 132 having a non-sharable resource connection 132a from send work queue 120a to receive work queue 126b and a non-sharable resource connection 132b from send work queue 126a to receive work queue 120b.

A send buffer WQE placed on one QP in a reliable connection service causes data to be written into the receive buffer of the connected QP. RDMA operations operate on the address space of the connected QP.

The reliable connection service requires a process to create a QP for each process which is to communicate with over the SAN fabric. Thus, if each of N host processor nodes contain M processes, and all M processes on each node wish to communicate with all the processes on all the other nodes, each host processor node requires $M^2 \times (N-1)$ QPs. Moreover, a process can connect a QP to another QP on the same SANIC.

In one embodiment, the reliable connection service is made reliable because hardware maintains sequence numbers and acknowledges all frame transfers. A combination of hardware and SAN driver software retries any failed communications. The process client of the QP obtains reliable communications even in the presence of bit errors, receive buffer underruns, and network congestion. If alternative paths exist in the SAN fabric, reliable communications can be maintained even in the presence of failures of fabric switches or links.

In one embodiment, acknowledgements are employed to deliver data reliably across the SAN fabric. In one embodiment, the acknowledgement is not a process level acknowledgment, because the acknowledgment does not validate the receiving process has consumed the data. Rather, the acknowledgment only indicates that the data has reached its destination.

Figure 4:
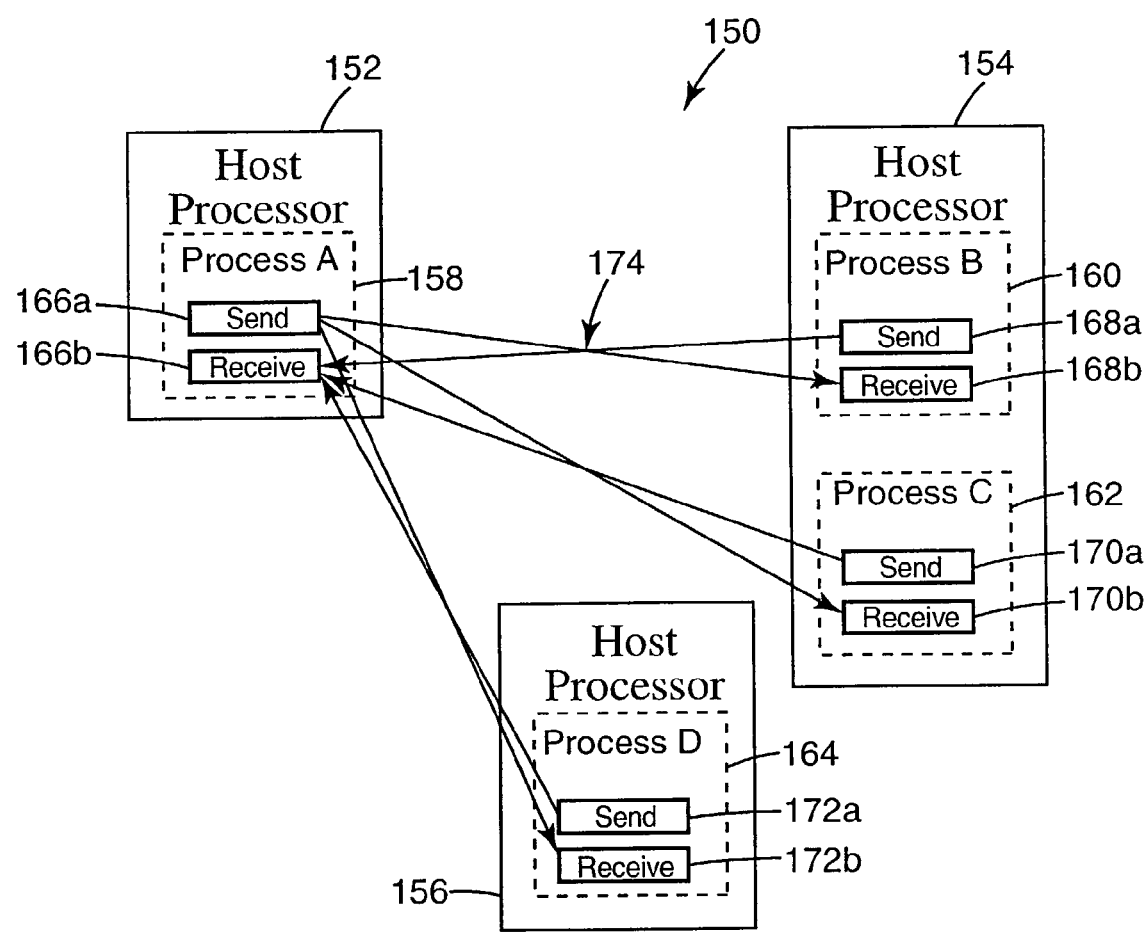
FIG. 4 is a diagram of a portion of distributed computer system employing a reliable datagram service to communicate between distributed processes.

A portion of a distributed computer system employing a reliable datagram service to communicate between distributed processes is illustrated generally at 150 in FIG. 4. Distributed computer system 150 includes a host processor node 152, a host processor node 154, and a host processor node 156. Host processor node 152 includes a process A indicated at 158. Host processor node 154 includes a process B indicated at 160 and a process C indicated at 162. Host processor node 156 includes a process D indicated at 164.

Host processor node 152 includes QP 166 having send work queue 166a and receive work queue 166b for facilitating communication to and from process A indicated at 158. Host processor node 154 includes QP 168 having send work queue 168a and receive work queue 168b for facilitating communication from and to process B indicated at 160. Host processor node 154 includes QP 170 having send work queue 170a and receive work queue 170b for facilitating communication from and to process C indicated at 162. Host processor node 156 includes QP 172 having send work queue 172a and receive work queue 172b for facilitating communication from and to process D indicated at 164. In the reliable datagram service implemented in distributed computer system 150, the QPs are coupled in what is referred to as a connectionless transport service.

For example, a reliable datagram service 174 couples QP 166 to QPs 168, 170, and 172. Specifically, reliable datagram service 174 couples send work queue 166a to receive work queues 168b, 170b, and 172b. Reliable datagram service 174 also couples send work queues 168a, 170a, and 172a to receive work queue 166b.

The reliable datagram service permits a client process of one QP to communicate with any other QP on any other remote node. At a receive work queue, the reliable datagram service permits incoming messages from any send work queue on any other remote node.

In one embodiment, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless QPs communicating between a pair of endnodes. Each endnode requires at least one EE context for every endnode it wishes to communicate with in the reliable datagram service (e.g., a given endnode requires at least N EE contexts to be able to have reliable datagram service with N other endnodes).

The reliable datagram service greatly improves scalability because the reliable datagram service is connectionless. Therefore, an endnode with a fixed number of QPs can communicate with far more processes and endnodes with a reliable datagram service than with a reliable connection transport service. For example, if each of N host processor nodes contain M processes, and all M processes on each node wish to communicate with all the processes on all the other nodes, the reliable connection service requires $M^2 \times (N-1)$ QPs on each node. By comparison, the connectionless reliable datagram service only requires M QPs+(N−1) EE contexts on each node for exactly the same communications.

A third type of transport service for providing communications is a unreliable datagram service. Similar to the reliable datagram service, the unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

A fourth type of transport service is referred to as raw datagram service and is technically not a transport service. The raw datagram service permits a QP to send and to receive raw datagram frames. The raw datagram mode of operation of a QP is entirely controlled by software. The raw datagram mode of the QP is primarily intended to allow easy interfacing with traditional internet protocol, version 6 (IPv6) LAN-WAN networks, and further allows the SANIC to be used with full software protocol stacks to access transmission control protocol (TCP), user datagram protocol (UDP), and other standard communication protocols. Essentially, in the raw datagram service, SANIC hardware generates and consumes standard protocols layered on top of IPv6, such as TCP and UDP. The frame header can be mapped directly to and from an IPv6 header. Native IPv6 frames can be bridged into the SAN fabric and delivered directly to a QP to allow a client process to support any transport protocol running on top of IPv6. A client process can register with SANIC hardware in order to direct datagrams for a particular upper level protocol (e.g., TCP and UDP) to a particular QP. SANIC hardware can demultiplex incoming IPv6 streams of datagrams based on a next header field as well as the destination IP address.

SANIC and I/O Adapter Endnodes

Figure 5:
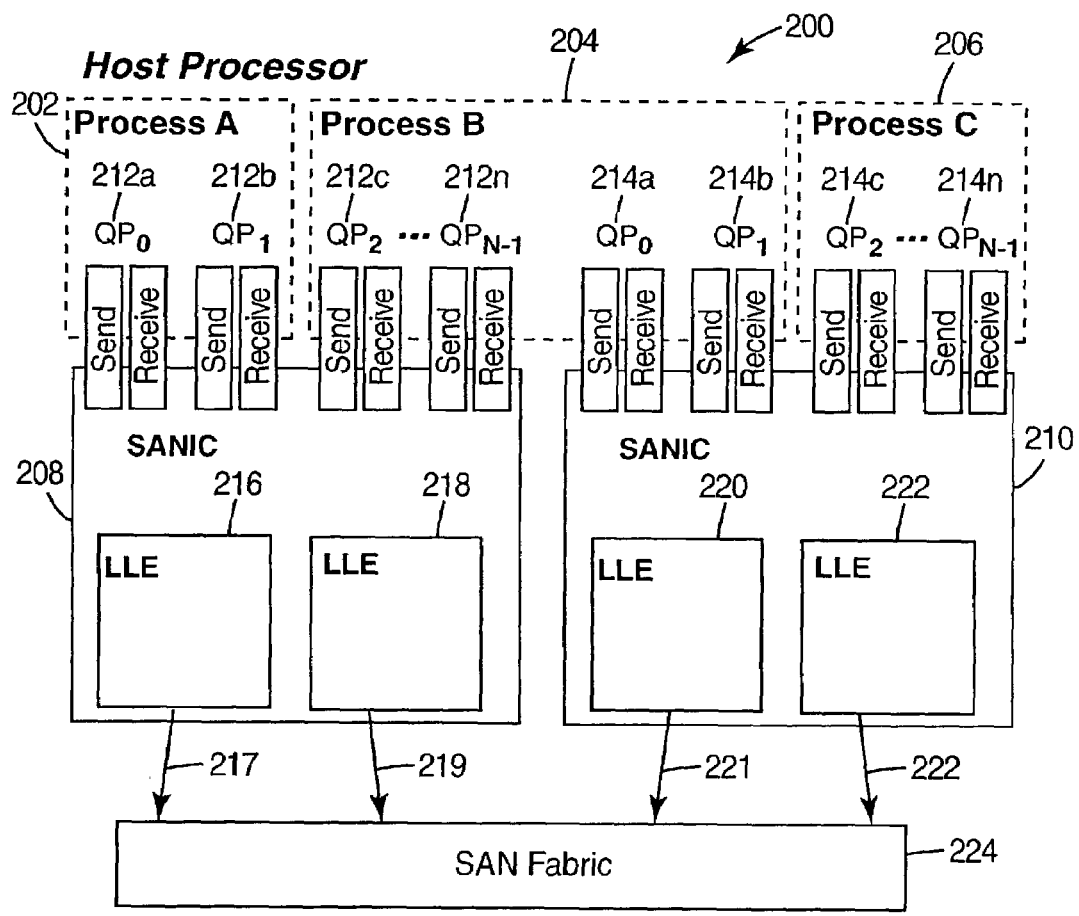
FIG. 5 is a diagram of an example host processor node for operation in a distributed computer system implementing the present invention.

An example host processor node is generally illustrated at 200 in FIG. 5. Host processor node 200 includes a process A indicated at 202, a process B indicated at 204, and a process C indicated at 206. Host processor 200 includes a SANIC 208 and a SANIC 210. As discussed above, a host processor endnode or an I/O adapter endnode can have one or more SANICs. SANIC 208 includes a SAN link level engine (LLE) 216 for communicating with SAN fabric 224 via link 217 and an LLE 218 for communicating with SAN fabric 224 via link 219. SANIC 210 includes an LLE 220 for communicating with SAN fabric 224 via link 221 and an LLE 222 for communicating with SAN fabric 224 via link 223. SANIC 208 communicates with process A indicated at 202 via QPs 212a and 212b. SANIC 208 communicates with process B indicated at 204 via QPs 212c–212n. Thus, SANIC 208 includes N QPs for communicating with processes A and B. SANIC 210 includes QPs 214a and 214b for communicating with process B indicated at 204. SANIC 210 includes QPs 214c–214n for communicating with process C indicated at 206. Thus, SANIC 210 includes N QPs for communicating with processes B and C.

An LLE runs link level protocols to couple a given SANIC to the SAN fabric. RDMA traffic generated by a SANIC can simultaneously employ multiple LLEs within the SANIC which permits striping across LLEs. Striping refers to the dynamic sending of frames within a single message to an endnode's QP through multiple fabric paths. Striping across LLEs increases the bandwidth for a single QP as well as provides multiple fault tolerant paths. Striping also decreases the latency for message transfers. In one embodiment, multiple LLEs in a SANIC are not visible to the client process generating message requests. When a host processor includes multiple SANICs, the client process must explicitly move data on the two SANICs in order to gain parallelism. A single QP cannot be shared by SANICS. Instead a QP is owned by one local SANIC.

The following is an example naming scheme for naming and identifying endnodes in one embodiment of a distributed computer system according to the present invention. A host name provides a logical identification for a host node, such as a host processor node or I/O adapter node. The host name identifies the endpoint for messages such that messages are destine for processes residing on an endnode specified by the host name. Thus, there is one host name per node, but a node can have multiple SANICs.

A globally unique ID (GUID) identifies a transport endpoint. A transport endpoint is the device supporting the transport QPs. There is one GUID associated with each SANIC.

A local ID refers to a short address ID used to identify a SANIC within a single subnet. In one example embodiment, a subnet has up $2^{16}$ endnodes, switches, and routers, and the local ID (LID) is accordingly 16 bits. A source LID (SLID) and a destination LID (DLID) are the source and destination LIDs used in a local network header. A LLE has a single LID associated with the LLE, and the LID is only unique within a given subnet. One or more LIDs can be associated with each SANIC.

An internet protocol (IP) address (e.g., a 128 bit IPv6 ID) addresses a SANIC. The SANIC, however, can have one or more IP addresses associated with the SANIC. The IP address is used in the global network header when routing frames outside of a given subnet. LIDs and IP addresses are network endpoints and are the target of frames routed through the SAN fabric. All IP addresses (e.g., IPv6 addresses) within a subnet share a common set of high order address bits.

In one embodiment, the LLE is not named and is not architecturally visible to a client process. In this embodiment, management software refers to LLEs as an enumerated subset of the SANIC.

Switches and Routers

Figure 6:
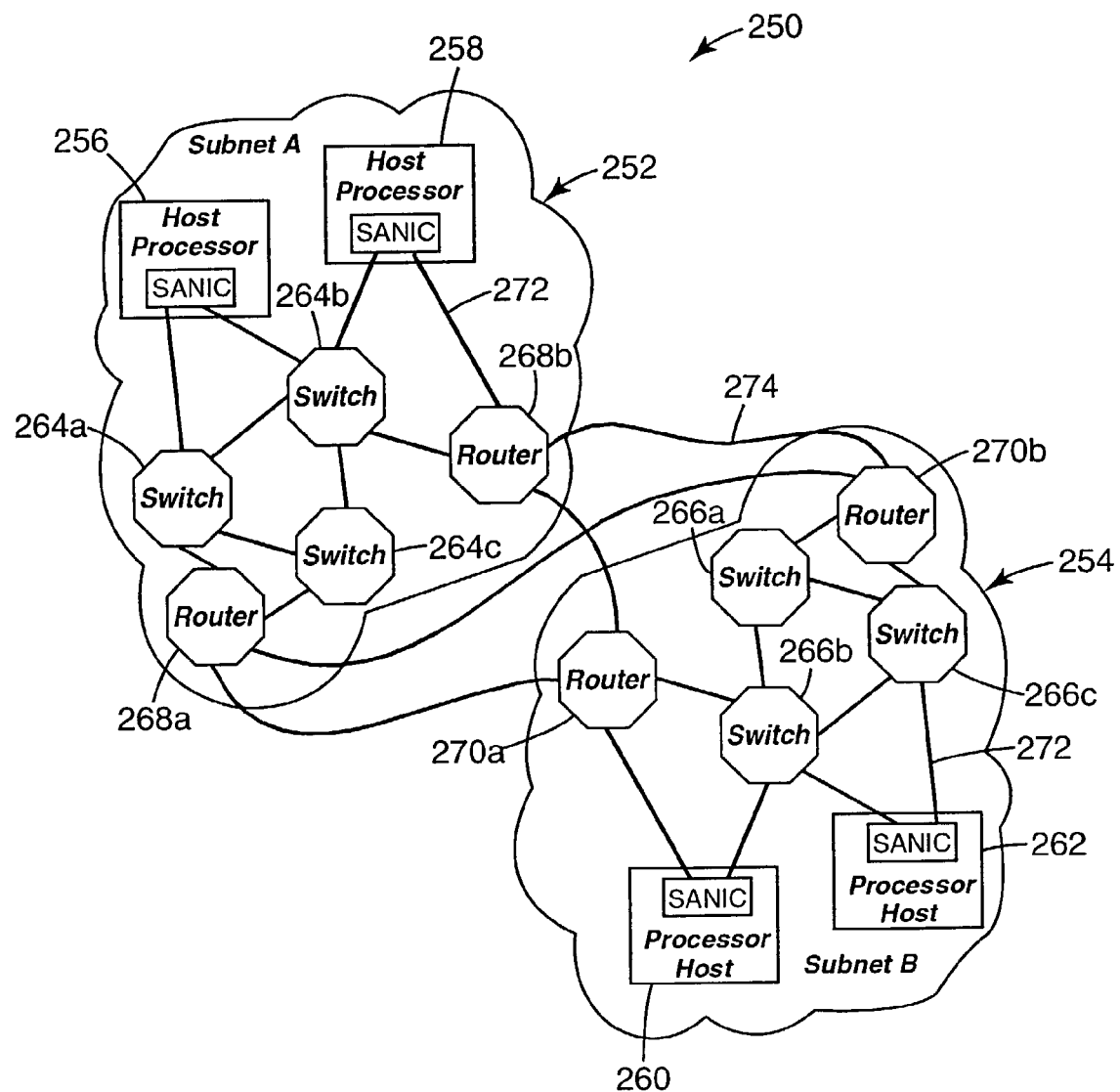
FIG. 6 is a diagram of a portion of a distributed computer system illustrating subnets in the distributed computer system.

A portion of a distributed computer system is generally illustrated at 250 in FIG. 6. Distributed computer system 250 includes a subnet A indicated at 252 and a subnet B indicated at 254. Subnet A indicated at 252 includes a host processor node 256 and a host processor node 258. Subnet B indicated at 254 includes a host processor node 260 and host processor node 262. Subnet A indicated at 252 includes switches 264a–264c. Subnet B indicated at 254 includes switches 266a–266c. Each subnet within distributed computer system 250 is connected to other subnets with routers. For example, subnet A indicated at 252 includes routers 268a and 268b which are coupled to routers 270a and 270b of subnet B indicated at 254. In one example embodiment, a subnet has up to $2^{16}$ endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast worm-hole or cut-through routing for messages.

A switch within a subnet examines the DLID that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 6, for expansion to much larger systems, subnets are connected with routers, such as routers 268 and 270. The router interprets the IP destination ID (e.g., IPv6 destination ID) and routes the IP like frame.

In one embodiment, switches and routers degrade when links are over utilized. In this embodiment, link level back pressure is used to temporarily slow the flow of data when multiple input frames compete for a common output. However, link or buffer contention does not cause loss of data. In one embodiment, switches, routers, and endnodes employ a link protocol to transfer data. In one embodiment, the link protocol supports an automatic error retry. In this example embodiment, link level acknowledgments detect errors and force retransmission of any data impacted by bit errors. Link-level error recovery greatly reduces the number of data errors that are handled by the end-to-end protocols. In one embodiment, the user client process is not involved with error recovery no matter if the error is detected and corrected by the link level protocol or the end-to-end protocol.

Figure 7:
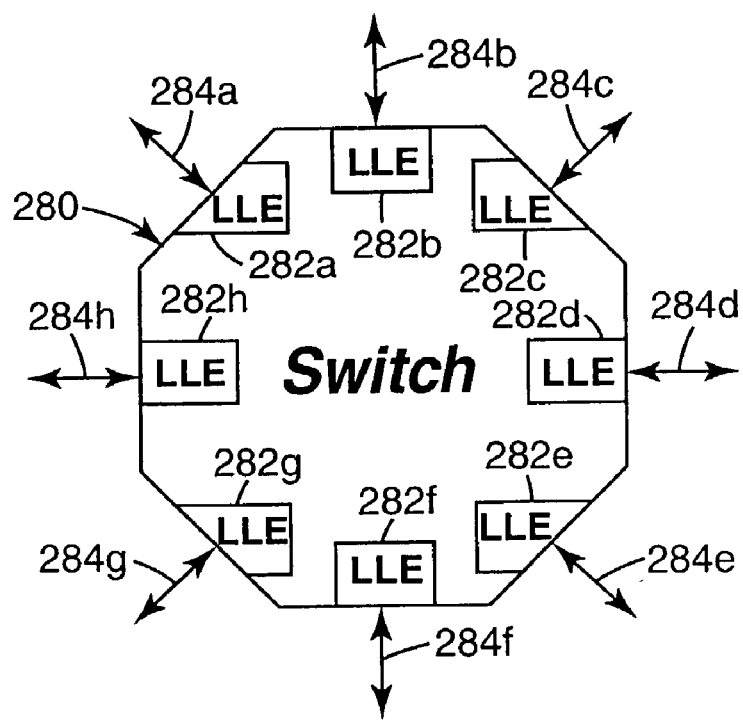
FIG. 7 is a diagram of a switch for use in a distributed computer system implemented the present invention.

An example embodiment of a switch is generally illustrated at 280 in FIG. 7. Each I/O path on a switch or router has an LLE. For example, switch 280 includes LLEs 282*a*–282*h* for communicating respectively with links 284*a*–284*h*.

The naming scheme for switches and routers is similar to the above-described naming scheme for endnodes. The following is an example switch and router naming scheme for identifying switches and routers in the SAN fabric. A switch name identifies each switch or group of switches packaged and managed together. Thus, there is a single switch name for each switch or group of switches packaged and managed together.

Each switch or router element has a single unique GUID. Each switch has one or more LIDs and IP addresses (e.g., IPv6 addresses) that are used as an endnode for management frames.

Each LLE is not given an explicit external name in the switch or router. Since links are point-to-point, the other end of the link does not need to address the LLE.

Virtual Lanes

Switches and routers employ multiple virtual lanes within a single physical link. As illustrated in FIG. 6, physical links 272 connect endnodes, switches, and routers within a subnet. WAN or LAN connections 274 typically couple routers between subnets. Frames injected into the SAN fabric follow a particular virtual lane from the frame's source to the frame's destination. At any one time, only one virtual lane makes progress on a given physical link. Virtual lanes provide a technique for applying link level flow control to one virtual lane without affecting the other virtual lanes. When a frame on one virtual lane blocks due to contention, quality of service (QoS), or other considerations, a frame on a different virtual lane is allowed to make progress.

Virtual lanes are employed for numerous reasons, some of which are as follows. Virtual lanes provide QoS. In one example embodiment, certain virtual lanes are reserved for high priority or isonchronous traffic to provide QoS.

Virtual lanes provide deadlock avoidance. Virtual lanes allow topologies that contain loops to send frames across all physical links and still be assured the loops won't cause back pressure dependencies that might result in deadlock.

Virtual lanes alleviate head-of-line blocking. With virtual lanes, a blocked frames can pass a temporarily stalled frame that is destined for a different final destination.

In one embodiment, each switch includes its own crossbar switch. In this embodiment, a switch propagates data from only one frame at a time, per virtual lane through its crossbar switch. In another words, on any one virtual lane, a switch propagates a single frame from start to finish. Thus, in this embodiment, frames are not multiplexed together on a single virtual lane.

Paths in SAN Fabric

Referring to FIG. 6, within a subnet, such as subnet A indicated at 252 or subnet B indicated at 254, a path from a source port to a destination port is determined by the LID of the destination SANIC port. Between subnets, a path is determined by the IP address (e.g., IPv6 address) of the destination SANIC port.

In one embodiment, the paths used by the request frame and the request frame's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria is contained in one routing table. In an alternative embodiment, a switch employs a separate set of criteria for each input port.

Each port on an endnode can have multiple IP addresses. Multiple IP addresses can be used for several reasons, some of which are provided by the following examples. In one embodiment, different IP addresses identify different partitions or services on an endnode. In one embodiment, different IP addresses are used to specify different QoS attributes. In one embodiment, different IP addresses identify different paths through intra-subnet routes.

In one embodiment, each port on an endnode can have multiple LIDs. Multiple LIDs can be used for several reasons some of which are provided by the following examples. In one embodiment, different LIDs identify different partitions or services on an endnode. In one embodiment, different LIDs are used to specify different QoS attributes. In one embodiment, different LIDs specify different paths through the subnet.

A one-to-one correspondence does not necessarily exist between LIDs and IP addresses, because a SANIC can have more or less LIDs than IP addresses for each port. For SANICs with redundant ports and redundant conductivity to multiple SAN fabrics, SANICs can, but are not required to, use the same LID and IP address on each of its ports.

Data Transactions

Referring to FIG. 1, a data transaction in distributed computer system 30 is typically composed of several hardware and software steps. A client process of a data transport service can be a user-mode or a kernel-mode process. The client process accesses SANIC 42 hardware through one or more QPs, such as QPs 64 illustrated in FIG. 2. The client process calls an operating-system specific programming interface which is herein referred to as verbs. The software code implementing the verbs intern posts a WQE to the given QP work queue.

There are many possible methods of posting a WQE and there are many possible WQE formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, SANIC hardware detects WQE posting and accesses the WQE. In this embodiment, the SANIC hardware translates and validates the WQEs virtual addresses and accesses the data. In one embodiment, an outgoing message buffer is split into one or more frames. In one embodiment, the SANIC hardware adds a transport header and a network header to each frame. The transport header includes sequence numbers and other transport information. The network header includes the destination IP address or the DLID or other suitable destination address information. The appropriate local or global network header is added to a given frame depending on if the destination endnode resides on the local subnet or on a remote subnet.

A frame is a unit of information that is routed through the SAN fabric. The frame is an endnode-to-endnode construct, and is thus created and consumed by endnodes. Switches and routers neither generate nor consume request frames or acknowledgment frames. Instead switches and routers simply move request frames or acknowledgment frames closer to the ultimate destination. Routers, however, modify the frame's network header when the frame crosses a subnet boundary. In traversing a subnet, a single frame stays on a single virtual lane.

When a frame is placed onto a link, the frame is further broken down into flits. A flit is herein defined to be a unit of link-level flow control and is a unit of transfer employed only on a point-to-point link. The flow of flits is subject to the link-level protocol which can perform flow control or retransmission after an error. Thus, flit is a link-level construct that is created at each endnode, switch, or router output port and consumed at each input port. In one embodiment, a flit contains a header with virtual lane error checking information, size information, and reverse channel credit information.

If a reliable transport service is employed, after a request frame reaches its destination endnode, the destination endnode sends an acknowledgment frame back to the sender endnode. The acknowledgment frame permits the requester to validate that the request frame reached the destination endnode. An acknowledgment frame is sent back to the requester after each request frame. The requestor can have multiple outstanding requests before it receives any acknowledgments. In one embodiment, the number of multiple outstanding requests is determined when a QP is created.

Example Request and Acknowledgment Transactions

Figure 8:
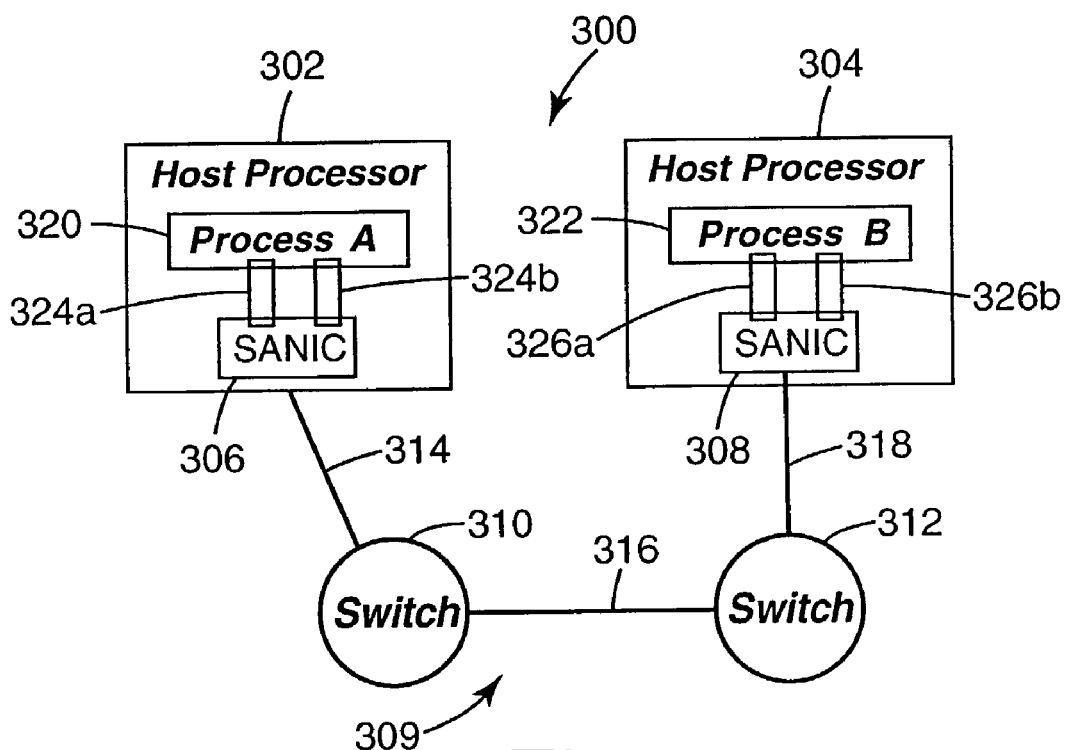
FIG. 8 is a diagram of a portion of a distributed computer system.

FIGS. 8, 9A, 9B, 10A, and 10B together illustrate example request and acknowledgment transactions. In FIG. 8, a portion of a distributed computer system is generally illustrated at 300. Distributed computer system 300 includes a host processor node 302 and a host processor node 304. Host processor node 302 includes a SANIC 306. Host processor node 304 includes a SANIC 308. Distributed computer system 300 includes a SAN fabric 309 which includes a switch 310 and a switch 312. SAN fabric 309 includes a link 314 coupling SANIC 306 to switch 310; a link 316 coupling switch 310 to switch 312; and a link 318 coupling SANIC 308 to switch 312.

In the example transactions, host processor node 302 includes a client process A indicated at 320. Host processor node 304 includes a client process B indicated at 322. Client process 320 interacts with SANIC hardware 306 through QP 324. Client process 322 interacts with SANIC hardware 308 through QP 326. QP 324 and 326 are software data structures. QP 324 includes send work queue 324a and receive work queue 324b. QP 326 includes send work queue 326a and receive work queue 326b.

Process 320 initiates a message request by posting WQEs to send queue 324a. Such a WQE is illustrated at 330 in FIG. 9A. The message request of client process 320 is referenced by a gather list 332 contained in send WQE 330. Each entry in gather list 332 points to a virtually contiguous buffer in the local memory space containing a part of the message, such as indicated by virtual contiguous buffers 334a–334d, which respectively hold message 0, parts 0, 1, 2, and 3.

Figure 9A:
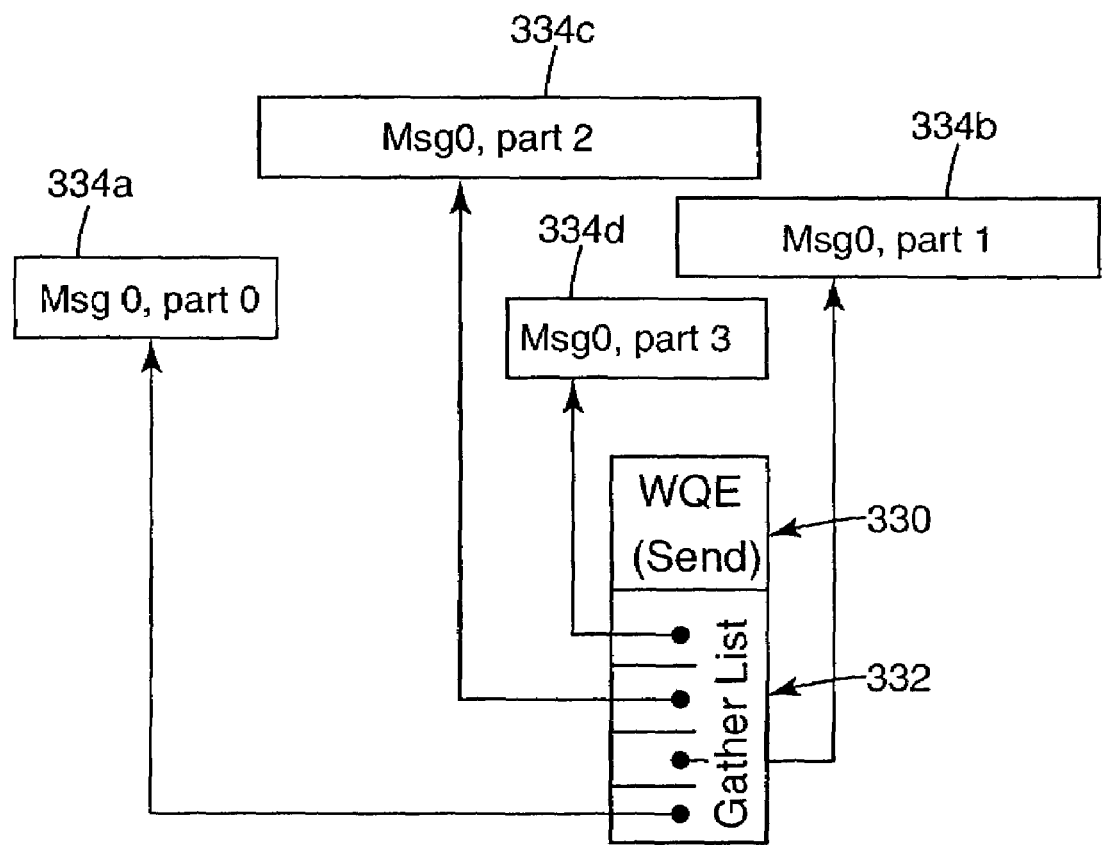
FIG. 9A is a diagram of a work queue element (WQE) for operation in the distributed computer system of FIG. 8.
Figure 9B:
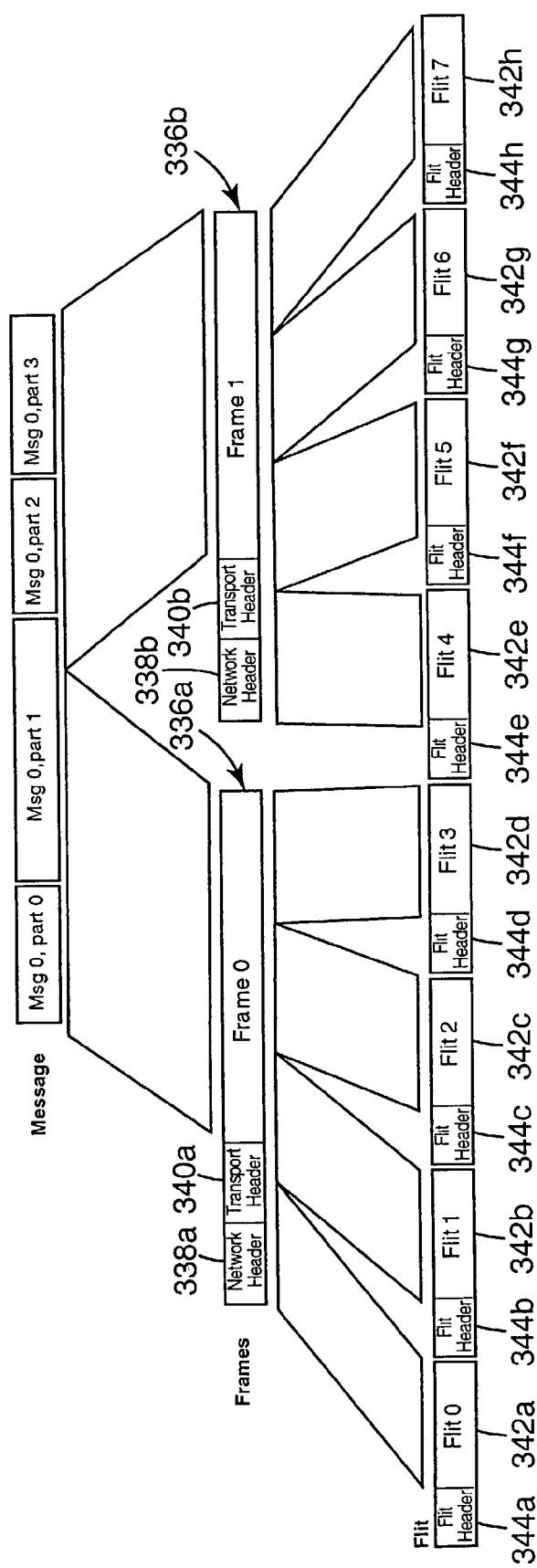
FIG. 9B is a diagram of the packetization process of a message created by the WQE of FIG. 9A into frames and flits.

Referring to FIG. 9B, hardware in SANIC 306 reads WQE 330 and packetizes the message stored in virtual contiguous buffers 334a–334d into frames and flits. As illustrated in FIG. 9B, all of message 0, part 0 and a portion of message 0, part 1 are packetized into frame 0, indicated at 336a. The rest of message 0, part 1 and all of message 0, part 2, and all of message 0, part 3 are packetized into frame 1, indicated at 336b. Frame 0 indicated at 336a includes network header 338a and transport header 340a. Frame 1 indicated at 336b includes network header 338b and transport header 340b.

As indicated in FIG. 9B, frame 0 indicated at 336a is partitioned into flits 0–3, indicated respectively at 342a–342d. Frame 1 indicated at 336b is partitioned into flits 4–7 indicated respectively at 342e–342h. Flits 342a through 342h respectively include flit headers 344a–344h.

Frames are routed through the SAN fabric, and for reliable transfer services, are acknowledged by the final destination endnode. If not successively acknowledged, the frame is retransmitted by the source endnode. Frames are generated by source endnodes and consumed by destination endnodes. The switches and routers in the SAN fabric neither generate nor consume frames.

Flits are the smallest unit of flow control in the network. Flits are generated and consumed at each end of a physical link. Flits are acknowledged at the receiving end of each link and are retransmitted in response to an error.

Figure 10A:
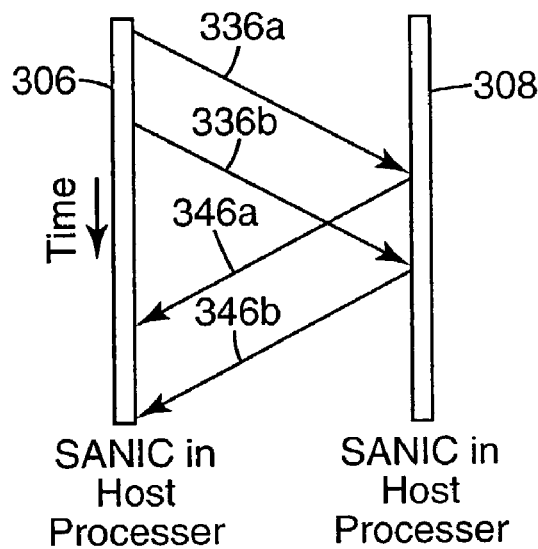
FIG. 10A is a diagram of a message being transmitted with a reliable transport service illustrating frame transactions.

Referring to FIG. 10A, the send request message 0 is transmitted from SANIC 306 in host processor node 302 to SANIC 308 in host processor node 304 as frames 0 indicated at 336a and frame 1 indicated at 336b. ACK frames 346a and 346b, corresponding respectively to request frames 336a and 336b, are transmitted from SANIC 308 in host processor node 304 to SANIC 306 in host processor node 302.

In FIG. 10A, message 0 is being transmitted with a reliable transport service. Each request frame is individually acknowledged by the destination endnode (e.g., SANIC 308 in host processor node 304).

Figure 10B:
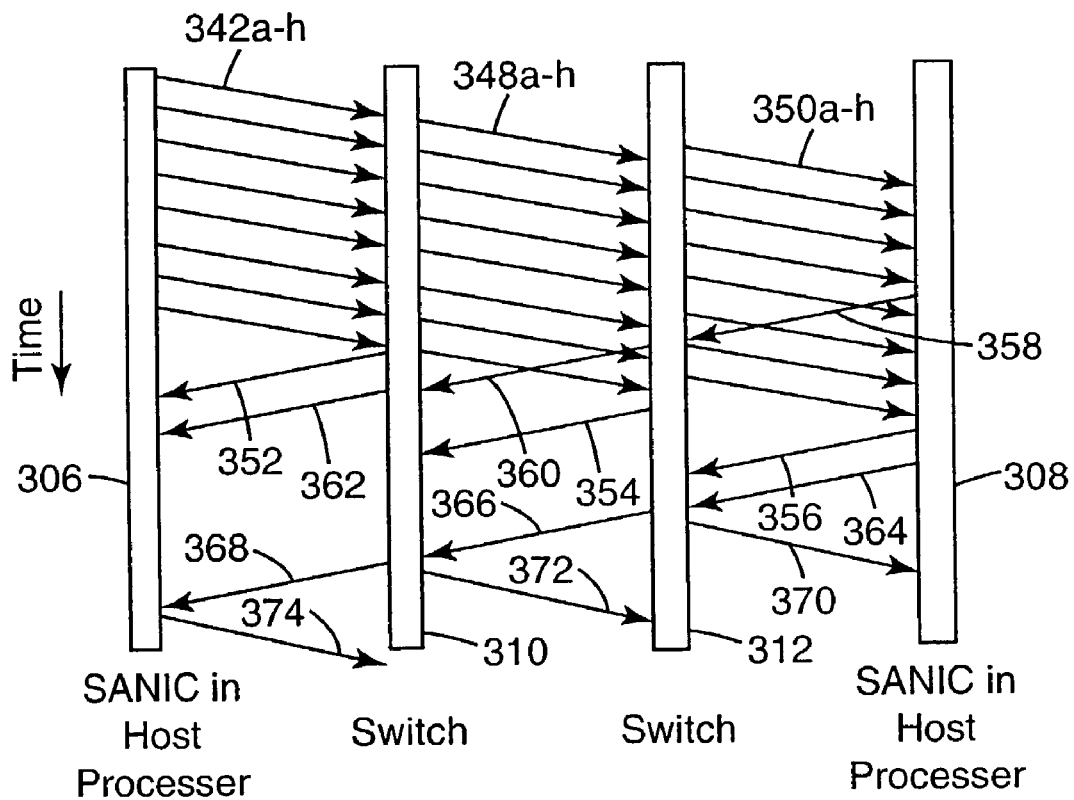
FIG. 10B is a diagram illustrating a reliable transport service illustrating flit transactions associated with the frame transactions of FIG. 10A.

FIG. 10B illustrates the flits associated with the request frames 336 and acknowledgment frames 346 illustrated in FIG. 10A passing between the host processor endnodes 302 and 304 and the switches 310 and 312. As illustrated in FIG. 10B, an ACK frame fits inside one flit. In one embodiment, one acknowledgment flit acknowledges several flits.

As illustrated in FIG. 10B, flits 342a–h are transmitted from SANIC 306 to switch 310. Switch 310 consumes flits 342a–h at its input port, creates flits 348a–h at its output port corresponding to flits 342a–h, and transmits flits 348a–h to switch 312. Switch 312 consumes flits 348a–h at its input port, creates flits 350a–h at its output port corresponding to flits 348a–h, and transmits flits 350a–h to SANIC 308. SANIC 308 consumes flits 350a–h at its input port. An acknowledgment flit is transmitted from switch 310 to SANIC 306 to acknowledge the receipt of flits 342a–h. An acknowledgment flit 354 is transmitted from switch 312 to switch 310 to acknowledge the receipt of flits 348a–h. An acknowledgment flit 356 is transmitted from SANIC 308 to switch 312 to acknowledge the receipt of flits 350a–h.

Acknowledgment frame 346a fits inside of flit 358 which is transmitted from SANIC 308 to switch 312. Switch 312 consumes flits 358 at its input port, creates flit 360 corresponding to flit 358 at its output port, and transmits flit 360 to switch 310. Switch 310 consumes flit 360 at its input port, creates flit 362 corresponding to flit 360 at its output port, and transmits flit 362 to SANIC 306. SANIC 306 consumes flit 362 at its input port. Similarly, SANIC 308 transmits acknowledgment frame 346b in flit 364 to switch 312. Switch 312 creates flit 366 corresponding to flit 364, and transmits flit 366 to switch 310. Switch 310 creates flit 368 corresponding to flit 366, and transmits flit 368 to SANIC 306.

Switch 312 acknowledges the receipt of flits 358 and 364 with acknowledgment flit 370, which is transmitted from switch 312 to SANIC 308. Switch 310 acknowledges the receipt of flits 360 and 366 with acknowledgment flit 372, which is transmitted to switch 312. SANIC 306 acknowledges the receipt of flits 362 and 368 with acknowledgment flit 374 which is transmitted to switch 310.

Architecture Layers and Implementation Overview

A host processor endnode and an I/O adapter endnode typically have quite different capabilities. For example, an example host processor endnode might support four ports, hundreds to thousands of QPs, and allow incoming RDMA operations, while an attached I/O adapter endnode might only support one or two ports, tens of QPs, and not allow incoming RDMA operations. A low-end attached I/O adapter alternatively can employ software to handle much of the network and transport layer functionality which is performed in hardware (e.g., by SANIC hardware) at the host processor endnode.

Figure 11:
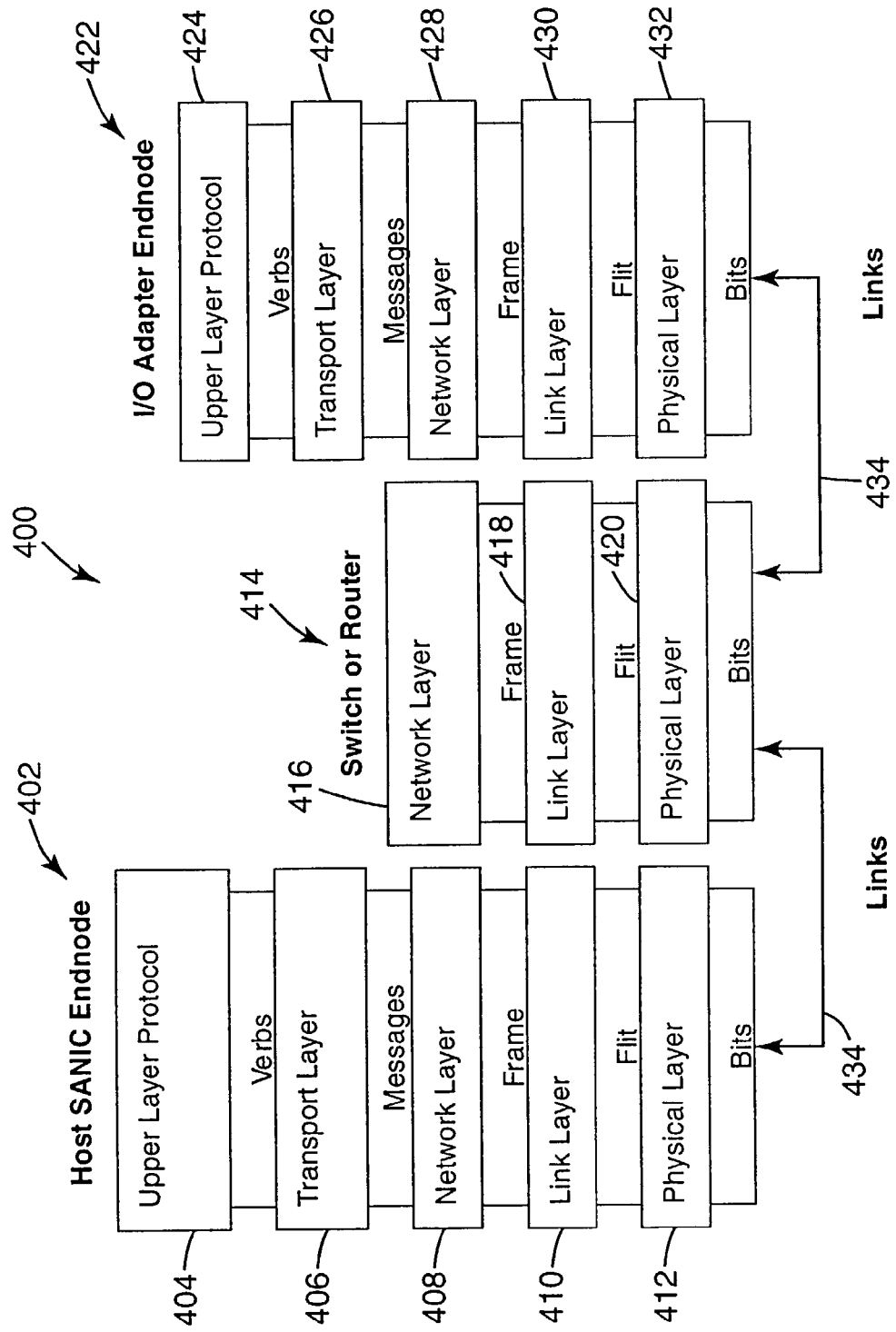
FIG. 11 is a diagram of a layered architecture for implementing the present invention.

One embodiment of a layered architecture for implementing the present invention is generally illustrated at 400 in diagram form in FIG. 11. The layered architecture diagram of FIG. 11 shows the various layers of data communication paths, and organization of data and control information passed between layers.

Host SANIC endnode layers are generally indicated at 402. The host SANIC endnode layers 402 include an upper layer protocol 404; a transport layer 406; a network layer 408; a link layer 410; and a physical layer 412.

Switch or router layers are generally indicated at 414. Switch or router layers 414 include a network layer 416; a link layer 418; and a physical layer 420.

I/O adapter endnode layers are generally indicated at 422. I/O adapter endnode layers 422 include an upper layer protocol 424; a transport layer 426; a network layer 428; a link layer 430; and a physical layer 432.

The layered architecture 400 generally follows an outline of a classical communication stack. The upper layer protocols employ verbs to create messages at the transport layers. The transport layers pass messages to the network layers. The network layers pass frames down to the link layers. The link layers pass flits through physical layers. The physical layers send bits or groups of bits to other physical layers. Similarly, the link layers pass flits to other link layers, and don't have visibility to how the physical layer bit transmission is actually accomplished. The network layers only handle frame routing, without visibility to segmentation and reassembly of frames into flits or transmission between link layers.

Bits or groups of bits are passed between physical layers via links 434. Links 434 can be implemented with printed circuit copper traces, copper cable, optical cable, or with other suitable links.

The upper layer protocol layers are applications or processes which employ the other layers for communicating between endnodes.

The transport layers provide end-to-end message movement. In one embodiment, the transport layers provide four types of transport services as described above which are reliable connection service; reliable datagram service; unreliable datagram service; and raw datagram service.

The network layers perform frame routing through a subnet or multiple subnets to destination endnodes.

The link layers perform flow-controlled, error controlled, and prioritized frame delivery across links.

The physical layers perform technology-dependent bit transmission and reassembly into flits.

Partitioning

In the context of distributed computer systems according to the present invention, such as distributed computer system 30 of FIG. 1, partitioning is the logical association of two endnodes with one another to allow the two endnodes to communicate directly with one another. As described above, an endnode can be an I/O adapter endnode or a host processor endnode. A host processor endnode can be a single entity or a cluster of single entities.

In a distributed computer system according to the present invention, such as distributed computer system 30 of FIG. 1, both host processor endnodes (e.g., host processor endnodes 34a–34d) and I/O adapter endnodes (e.g., I/O adapter endnodes 35a and 35b and RAID subsystem endnode 33) are attached to one another through a SAN fabric such as SAN fabric 32. Endnodes of both types are visible to one another through the SAN fabric. Without a mechanism such as partitioning, it would be unclear which endnodes are allowed to communicate with one another (e.g., whether a given host processor endnode is allowed to use certain I/O adapter endnodes).

The architecture for designing and developing distribute separate systems having partitioning mechanisms according to the present invention provides the basis of distributed computer systems that are highly scalable, from very small distributed computer systems up to very large distributed computer systems, while at the same time being highly robust, simple to manage, and able to support a wide variety of commonly available operating systems with as little change as possible.

In general, partitioning is the appearance, created by hardware, firmware, or software, that a single physical unit is divided into multiple logical or physical units called partitions. A partitioning infrastructure potentially allows system and adapter developers to implement partitioning techniques for host processor nodes, I/O devices, and subsystems within the distributed computer system itself, although full support for this wide range may not be present in initial releases.

Elaborate partitioning support is typically inappropriate for and is not required for systems in the entire range supported by the SAN fabric architecture for implementing the present invention. For illustration, the following three system types are considered: singleton; shared I/O cluster; and local I/O cluster.

A singleton is defined to be a single host processor node using the SAN fabric as its I/O subsystem.

A shared I/O cluster is defined to be a system with multiple hosts (i.e. a cluster), connected by SAN fabric, in which all or nearly all endnodes are sharable through the SAN fabric.

A local I/O cluster is defined to be a system with multiple hosts (i.e. a cluster), in which most of the I/O subsystem is purely local to each host and some is shared using the SAN fabric. This is an intermediate system type between the singleton and shared I/O cluster types.

In one embodiment of a partitioning mechanism for singleton systems, autonomous partition formation covers a typical scenario where the host processor and all I/O devices are in a single partition. This is a logical equivalent to having no partitioning.

Partitioning

Figure 12:
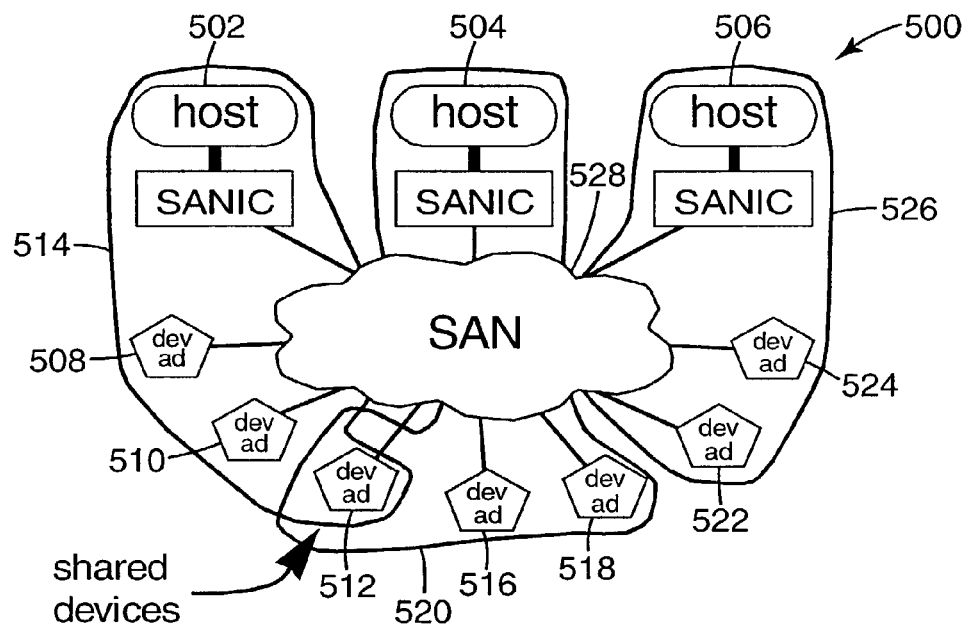
FIG. 12 is a diagram of a distributed computer system illustrating example endpoint partitions.

One embodiment of a shared I/O cluster distributed computer system 500 which provides an infrastructure to implement endpoint partitioning according to the present invention is generally illustrated in FIG. 12. Endpoint partitioning is defined as the creation of explicit sets of SAN endpoints that are allowed to communicate with each other.

Shared/I/O cluster distributed computer system 500 includes a host processor node 502, a host processor node 504, and a host processor node 506. Host processor node 502 communicates with devices/adapters 508, 510, 512 operating within an area indicated at 514. Similarly, host processor node 504 communicates with devices/adapters 512, 516, and 518 operating within an area indicated at 520. Similarly, host processor endnode 506 communicates with devices/adapters 522 and 524 operating within the area indicated at 526.

In addition, host processor nodes 502, 504, and 506 and device/adapters 508, 510, 512, 516, 518, 522, and 524 are all attached to a physically shared SAN fabric 528. Nevertheless, with the endpoint partitioning infrastructure according to the present invention, an explicit set of SAN endpoints are required to allow communication between host processor nodes and devices/adapters through the SAN fabric 528. Thus, sharing of a device/adapter between area 514 and 516 is achieved by including the device/adapter 512 which is labeled for both areas 514 and 516 and as such can communicate with host processor endnodes 502 and 504.

Endpoint partitioning is required in the shared I/O clusters for at least two reasons.

First, clusters are not always composed of systems that cooperate with one another. In server consolidation, for example, completely independent systems are clustered together for ease of physical administration, consolidated storage administration, and other reasons. These systems may be heterogeneous in software or in hardware, and the operation or failure of one should not affect the others. Systems sharing a common fabric or a common endnode may affect one another's performance in terms of these shared resources. Therefore, completely independent systems must be isolated from one another. Endpoint partitioning provides that isolation.

Secondly, even when clusters are composed of systems that do cooperate, the systems do not necessarily share many, or even most, endnodes. In fact, nearly all current operating systems are architected under the assumption that most endnode devices are not shared, assuming the operating system supports some form of sharing. The shared nothing software architecture is a very common software architectural position. Endpoint partitioning allows those systems to view their devices as belonging to them alone, even if shared. Partitioning is required for shared I/O clusters because without it, most operating systems will not operate in such a cluster.

Note that in both cases above, it is desirable to attach all devices to a physically shared SAN fabric, such as SAN fabric 528. To facilitate applying common high-level management functions. Attaches all devices to a physically shared SAN fabric, also dramatically simplifies "failing over" devices from one host to another, as required to avoid unplanned outages due to failures and planned outages for upgrades and system modification.

However, not all cluster systems have all devices connected through a single SAN fabric, such as the local I/O cluster system type. In the local I/O cluster system an adapter to host connection is either on a separate subnet or employs a different I/O connection (e.g. PCI).

Characteristics of Endpoint Partitioning

SAN fabric partitioning supports transparent isolation of resources between defined partition member sets without regard to partition topology.

Transparent refers to that software, including operating systems, device drivers, and applications (but not necessarily all firmware), that operates in a given singleton system will also operate without change in an equivalent partition of a larger system. This software may be aware that is partitioned, but the partitioning is transparent in that it does not affect any operation of the operating systems, drivers, or applications.

Isolation refers to that software, firmware, and hardware operations in one partition do not affect the operation of other partitions except for operations on shared resources. This specifically includes aberrant behavior, such as bugs, crashes, errors, and the like in one partition should have as little effect as possible on other partitions. SAN fabric partitioning where the SAN fabric paths are not shared combined with unshared endnodes yields complete isolation. another.

The partition member sets may have non-empty intersections, which refers to an endnode being in more than one partition. This implies that resources at the intersection(s) are shared between partitions.

A Partition Manager (PM) provides definition and setup of the partitions on a subnet. The PM is a trusted, omniscient entity not in any partition set.

In one embodiment, a PM can span subnets. If there are multiple management domains in a subnet multiple PMs can exist per subnet.

A PM that spans subnets has a partition management agent in each subnet that it employs to perform PM operations (e.g. write and invalidate PKeys). There may be one or more possibly shared management agents per subnet for use by multiple PMs.

Omniscient refers to that the PM has knowledge of all partitions in the PM's management domain. No other entity of the system directly has this omniscient attribute. In one embodiment however, a given PM is part of a larger management entity. Specified interfaces to that PM are used to effect actions on partitions, but not direct commands from other entities.

Partition managers may or may not be able to communicate with one another. It would be such capability to facilitate the merging of non-globally partitioned subnets. Globally partitioned subnets do not require an active PM.

In one embodiment, the PM cannot be an operating system function, because partitioning should maintain isolation in the presence of aberrant operating system, driver, or application behavior. Nevertheless, in one embodiment, a trusted application executing a given operating system, given that the operating system does not control PM functions in such a way that allows faults or aberrant behavior to propagate outside a partition, or inadvertently enforces operating systems-specific policy in heterogeneous operating system environments.

In one embodiment, if a partition manager is not present, a default global partition is used. In other words, all endnodes on the subnet without a PM, are members of the same partition.

Path isolation (i.e. fabric partitioning or zoning) may also be present in the SAN fabric. If path isolation is present, path isolation may affect endnode-to-endnode partitioning by virtue of path control. Path isolation, however, may not be sufficient for a full endnode-to-endnode partitioning solution, because path isolation does not address overlap of partition sets (e.g. sharing of devices) or levels of service to I/O devices. Full isolation of endnode-to-endnode partitions and path isolation require the collaborative and combined efforts of both a fabric manager and a PM.

Partitioning does not preclude the sharing of an endnode by other endnodes, which is referred to as endnode resource sharing. Endnode resource sharing suggests that an endnode is part of multiple partitions simultaneously or at least multiple other endnodes are communicating with that endnode simultaneously. In one example embodiment, the resources that may need to be isolated by the endnode resource sharing function, but not by the PM function, include work queues and associated resources; routing tables and associated resources; and resources of endnodes.

As to isolating work queues and associated resources. In a shared device, it maybe necessary to allocate work queues to hosts so one host cannot, by requesting all resources, affect a denial of service attack on another. As to isolating a port of a SCSI adapter or some peripherals on those ports. The SAN fabric is architecturally a shared resource, and paths through the SAN fabric must be able to be used by partitioning endnodes. In order to achieve isolation of resources of endnodes, such as an endnode may need to represent itself as multiple logical endnodes, even if the endnode has only a single GUID.

Definition of Partition, Inclusions, Non-Inclusions

A partition is the association of two or more end-nodes with one another. This association enables communication between the endnodes in a given partition. The association of endnodes in a singleton system where there are only two endnodes does not require an active management function to enable this association. Instead, a global partition is created. This global partition is represented by a well-known key value used by singleton partitions. If more than two endnodes exist in a subnet, then a partition management function is required to establish associations, or partitions if they are to be other than a global partition. Each of these partitions is represented by an application and operating systems-opaque Partition Key (PKey) that must be unique within a subnet.

The association of endnodes is accomplished by providing each endnode in any given partition a common PKey value. The PKey value must be unique within any given subnet, or if different subnets contain endnodes that are partitioned with one another (i.e. cross subnet partition), the PKey must be unique within affected subnets. The partition manager generates the PKey at the time that a partition is created. Each frame exchanged between endnodes contains the PKey value and a frame is honored only if the PKey matches a known value. Frames not matching a valid PKey are rejected and an error is returned to the originator, such as a nonexsistent device error. When an endnode supports the function of storing error logs, such as PKey mismatches, a policy can be enforced to have the affected endnode send an alert to a management agent.

In one embodiment, interfaces to a SANIC library do not require and do not use a PKey. In one embodiment, the PKey is not visible at any level other by the SANIC or a target LLE. This characteristic is what enables transparency of partitioning to operating systems, drivers, and applications. Likewise, the PKey is not involved with other SAN security, fabric partitioning (i.e. zoning) or memory operations. Instead, an operating system can only access a PKey index.

Partition membership is defined by all devices having a matching PKey. Any endnode that provides an identical PKey, as any other endnode is in the same partition. Frame generation includes the insertion of a PKey into the frame header. The only exception to the insertion of a PKey into the frame header is unreliable datagram frames or raw IP.

PKey for Protection

Every DLID in a subnet shall have a PKey value associated with a DLID. The PKey is indicated by an index to the PKey's location in a table. In the case of a globally partitioned subnet, the PKey is the same for all endnodes in the subnet, so only one index to a PKey exist for all DLIDs targeted by the SANIC.

In one embodiment, the PKey is located in a frame context areas of every frame header. The PKey exists in the frame context area as a value referred to as the frame Key (FKey). The FKey is the value resulting from PKey XOR/QP Key (QKey) value. In order for a target to extract the PKey, the combined value must be scored with the QKey. The extracted PKey is compared against a known PKey value. In one embodiment an XOR function in the LLE performs the XOR functions. PKeys are stored in a lookup table that includes a PKey, the IP addresses (e.g., IPvG addresses) and/or DLIDS pertinent to that particular PKey value. In one embodiment, the lookup table data is stored in non-volatile memory at the endnode. Both adapter/LLE and SANIC class endnodes are required to support non-volatile memory storage of PKeys. The non-volatile memory storage of PKeys is required to ensure that, in the absence of a PM, partitioning is persistent across power cycles.

In one embodiment, the PM stores a superset of the PKey information, which is the IP address-PKey association lookup table in non-volatile memory. However, how and where the PM stores the PM information is implementation-specific. For an example SANIC, a IPAddress-DLID-PKey tuple consumes 176 bits. A SANIC required to support a minimum of N partitions, must support at least N PKeys. A sharable adapter endnode using a simple LLE must support partitions, so must have a minimum of table space.

An EE context in the frame header carries the index value to the PKey that is to be compared against the incoming PKey value stored in the frame context field with the QKey as an XOR'd value. This substantially eliminates a need for content-addressable memory at endnodes for the purpose of storing a list of PKeys against which to compare every incoming PKey. In an example embodiment having 32-bit PKeys Non-sharable adapters need only 64-bits of table space (e.g., 32-bits for the old PKey, before it is invalidated and 32-bits for the new PKey that is replacing the old PKey). This allows for a recovery if the write of the new PKey fails by writing an incorrect value or through some other failure perhaps associated with unreliable datagram service used by management messages.

In one embodiment, PKey values are accepted by an endnode to be placed in the PKey-DLID/IP Address table only when a correct management key (MKey) is passed with a new PKey value. The MKey is used only for management messages. In one embodiment, the MKey is used by PM when the PM is creating partitions by writing PKeys or removing an endnode from a partition by invalidating a PKey. PKeys are paired with DLIDs at the SANIC. Frames are sent to a destination endnode only if there is a PKey associated with the DLID, except for unreliable datagrams identified by an IP address.

In one embodiment, SANICs store PKey values in persistent form so that the PM does not have to repartition it on behalf of a management agent on each power-up. An adapter-type endnode (i.e., non-SANIC based endnode) is required to have persistent PKey non-volatile memory storage and is also required to have persistent management authentication value storage so that an invalid PM cannot invalidate or over write PKeys. When an adapter's PKeys are persistent, the adapter precludes an unmanaged hot swap of it to another partition. That is, a managed, partitioned adapter may not be moved to another partition until the adapter's PKeys and MKey have been reset.

If an endnode is inadvertently removed to another partition without the PKeys and MKey being reset by authorized management entities and if it is imperative that the endnode be usable in the new partition, some override of those values must be provided. Some suitable mechanisms for overriding of those values include: a jumper or jumpers to zero the non-volatile memory when power is applied; custom repair/manufacturing hardware that replaces or zeros the non-volatile memory; some secure software mechanism for setting the non-volatile stored values to a factory default value; and some combination of the above or other suitable mechanisms.

Partition Management

A Partition Manager must exist in subnets which are not globally partitioned. An example of a globally partitioned subnet is a singleton system SANIC-adapter LLE pair. The PM generates PKeys and associates identical PKeys with all endnodes within a specific partition. The PM sends the appropriate authentication value and a PKey to be written to tables used by SANICs and LLEs.

The PM must maintain a complete list of IP Address-DLID-PKey values for a given subnet. An IP Address-PKey reference is needed for some recover scenarios where abrupt hot plug/unplug events occur. DLIDs are not necessarily persistent across power cycling and may also be reassigned due to an event that causes autonomous protocol to change DLIDs (e.g., a hot plug event). The IP Address-DLID PKey list, whether distributed or consolidated, must be kept persistent from power on to power on. This ensures that the association of an endnode with its targeted endnodes does not change without explicit direction from an authorized management entity. Preferably, primary and a fail-over list be maintained for high availability.

A human-readable partition list is likely a grouped listing of IP Addresses within a management domain that share a common PKey. This is, however, dependent upon policy of the management providers. PKeys are not directly visible to applications or operating systems, with the exception of the PM function.

Partitioning Across Subnets in a Single Management Domain

In one embodiment, PMs may span subnets, but partition management agents may not span subnets. In addition, multiple management domains and therefore multiple management agents can exist within a given subnet.

Figure 13:
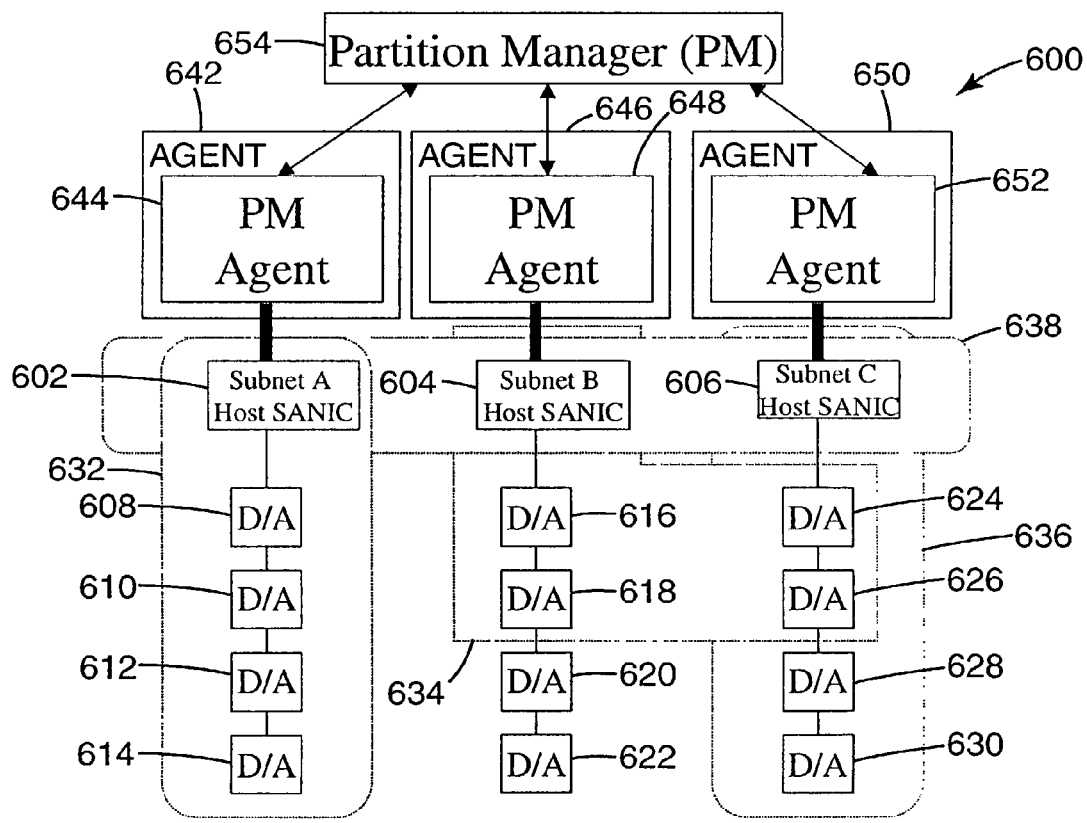
FIG. 13 is a diagram of a distributed computer system illustrating multiple subnets under a single management domain.

A distributed computer system having multiple subnets under a single management domain is illustrated generally at 600 in FIG. 13. Distributor computer system 600 includes a host processor node 602 which is locally physically attached to devices/adapters 608, 610, 612, and 614. Host processor node 604 is locally physically attached to devices/adapters 616, 618, 620, and 622. Host processor node 606 is locally physically attached to devices/adapters 624, 626, 628, and 630.

Additionally, host processor node 602 is logically partitioned with devices/adapters 608, 610, 612, and 614 in a subnet A indicated at 632. Host processor node 604 is logically partitioned with devices/adapters 616, 618, 624, and 626 in a subnet B indicated at 634. Host processor node 606 is logically partitioned with devices/adapters 624, 626, 628, and 630 in a subnet C indicated at 636. Thus, devices/adapters 624 and 626 are shared between subnet B indicated at 634 and subnet C indicated at 636.

Devices and endnodes in distributed computer system 600 are coupled via a physically shared SAN fabric 638. Nevertheless, with the endpoint partitioning infrastructure according to the present invention, an explicit set of SAN endpoints are required to allow communication between host processor node and devices/adapters through the SAN fabric 638. Accordingly, subnet A indicated at 632 includes an agent 640 including a PM agent 644. Subnet B indicated at 634 includes an agent 646 including a PM agent 648. Subnet C indicated at 638 includes an agent 650 having a PM agent 652. A single partition manager (PM) 654 manages PM agents 644, 648, and 652, and thereby manages subnet A indicated at 632, subnet B indicated at 634, and subnet C indicated at 636.

Thus, PM 654 is a single management entity that spans subnets to enable partitions, to also span subnets. As illustrated in FIG. 13, some endnodes, including SANIC endnodes and device/adapters endnodes, are members of more than one partition simultaneously, so partitions overlap one another. This overlap is accomplished by the ability to store and evaluate against multiple PKeys for each frame's PKey transferred to that endnode. Endnodes may send frames to themselves. PKeys always match a value that they know.

The agent itself acts on behalf of the overall PM, which is often implemented as part of an overall system management function. As an agent of the PM, the PM agent's specific responsibilities are minimally to read and to write and to invalidate PKeys at specific endnodes. PKey writes to an endnode allow it to communicate with other endnodes that also have the PKey. A write may also be an over write of a PKey at a specific PKey index. The write is to store a PKey value at index $\underline{n}$. Invalidating a PKey at an specified index in an endnode prevents that endnode from communicating with other endnodes with that PKey. To completely dismantle a partition, the PKey that corresponded with that partition must be invalidated at each endnodes that was part of that particular partition. Other higher level PM tasks (e.g., storing PKey-IPv6 tables) are not part of the minimum requirements for PM agents themselves.

Partitioning Across Management Domains

For partitions to span management domains, it is necessary for PMs to communicate with one another to cooperate in the establishment and maintenances and tear-down of partitions of these partitions of these partitions. The actions that PMs may attempt to perform with respect to one another are expected to be: enumerate endnodes available to be partitioned; partition endnodes on other PM's subnet with a partition an endnode on local PM's subnet; and invalidate a partition key for one or more endnodes.

In enumerating endnodes available to be partitioned, there needs to be clarified what makes endnodes available or not available. This is subnet/operating system policy.

Partitioning endnodes on other PM's subnet with a partition an endnode on local PM's subnet involves either negotiating a new PKey to merge partitions or assigning a remote endnode with local partition (i.e., pass a known PKey to an endnode on another subnet).

Invalidating a PKey for one or more endnodes on a subnet other than the one the PM manages, thereby remove that endnode from a partition.

In one illustrative embodiment, PKeys are 32-bit values, and there are up to 64K endnodes per subnet. There is a virtually infinite number of possible subnets. Partitions may include any number of endnodes across multiple subnets, per the current requirement, unless otherwise architecturally limited. This implies that the number of partitions that may exist at one time in communicating subnets is $2^{32}$ for the example embodiment where PKeys are 32-bit values. This limit must be enforced to ensure that partitions are not inadvertently violated by the use of a duplicate PKey when they are allowed to communicate across subnets or other management domains.

Communication of endnodes between subnets may be done through a router or an analogous function (e.g., a host resident application). Therefore, IP addresses are employed by the router or an analogous function to identify a targeted endnode. The local routing header (LRH), however, needs only to contain the DLID. The IP address information is needed by a PM, then, to identify and to partition to an endnode in another subnet. When a PM lists partitioned endnodes to another PM, the IP address must be included in the enumeration information, and the IP address includes the GUID.

In order for PMs to establish partitions across management domains, a protocol is employed that follows the general procedure for creation and tear-down of partition membership. Once a cross-management domain partition is created, it will have dual ownership by PMs. Either or both PMs may tear down a cross-management domain partition by invalidating a PKey of an endnode in the PM(s)'s respective domain(s). The PM may take such action with or without informing the other PMs about the PKey invalidation. For cooperating, healthy, PMs this is likely an action taken due to a request for an endnode to be removed from a cross-subnet-partition. Should the PMs lack an ability to communicate in their normal way, this action may be taken without consent or notification of other PMs.

Figure 14:
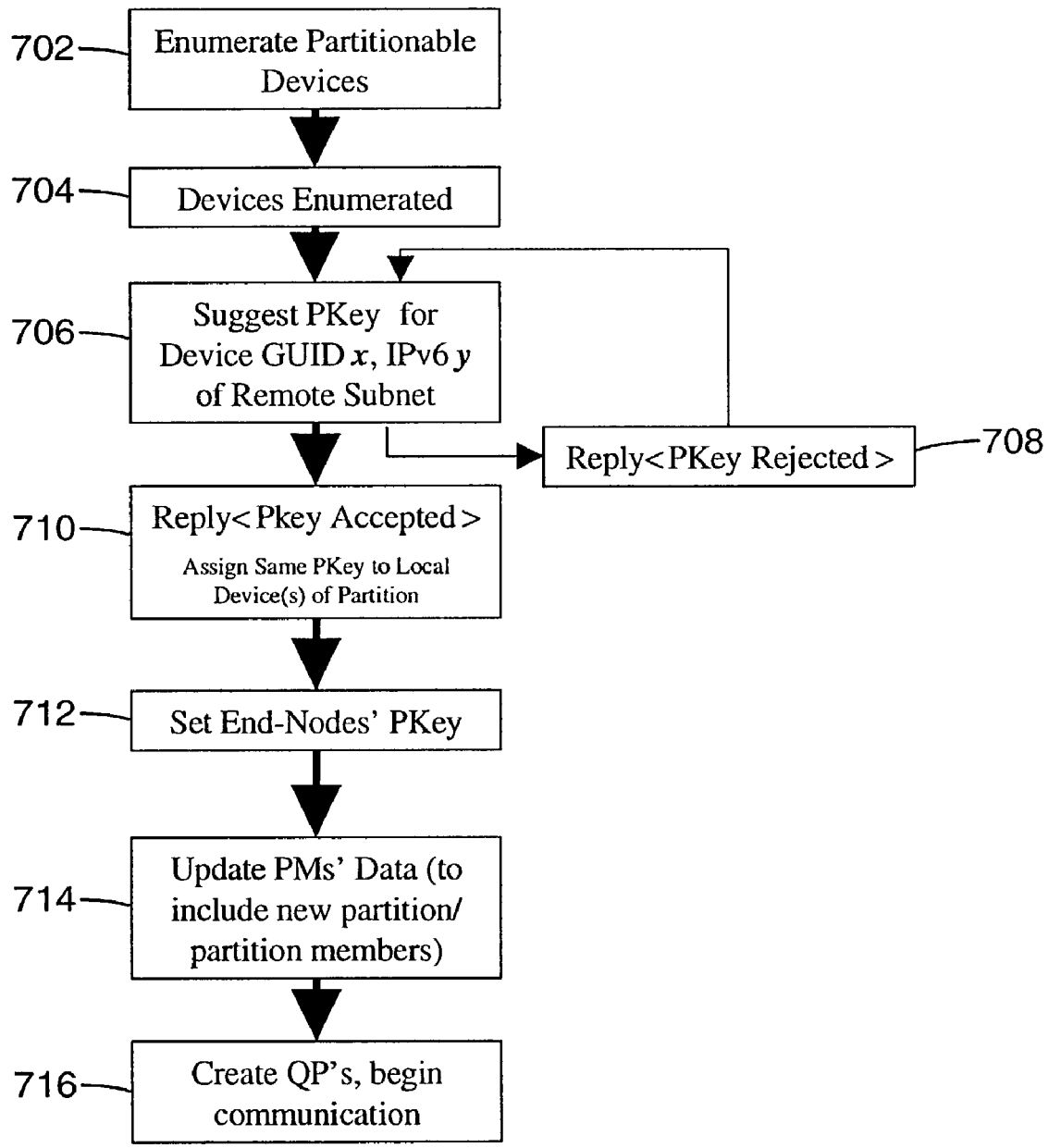
FIG. 14 is a flow diagram of a protocol for creating a new cross-management domain partition.

An example embodiment of a protocol for creating a new cross-management domain partition is generally illustrated at 700 in FIG. 14. At step 702, the PM enumerates partitional devices. At step 704, the devices are enumerated. At step 706, the PM suggests a new PKey value for device GUID x, IPv6 y of remote subnet. The suggested PKey value is a new PKey value from the perspective of the PM that suggests a PKey value. The PKey value may or may not be new or unique on another domain, because the new PKey value may be in use for other partitions.

At step 708, the PKey is rejected because the PKey value is in use by another partition of the remote management domain, and the protocol 700 returns to step 706 to have the PM suggest a new PKey value.

At step 710, a new PKey value is accepted because the new PKey value is new to the remote domain and is accepted for creation of the new partitioning arrangement. Thus, at step 710, the same PKey value is assigned to local devices of the partition.

At step 712, the endnode's PKey is set. At step 714, the PMs data is updated to include new partition/partition members.

At step 716, QPs are created and communication between partitioned domains can begin.

The procedure for adding a device to an existing cross-management domain partition is a slight variant of the process of creating a new cross-management domain such as illustrated in FIG. 14. When adding a device to an existing cross-management domain, however, the initial suggested PKey is that of an existing partition. If the PKey is accepted, the local endnodes do not have to have a PKey invalidated and a new value inserted.

Figure 15:
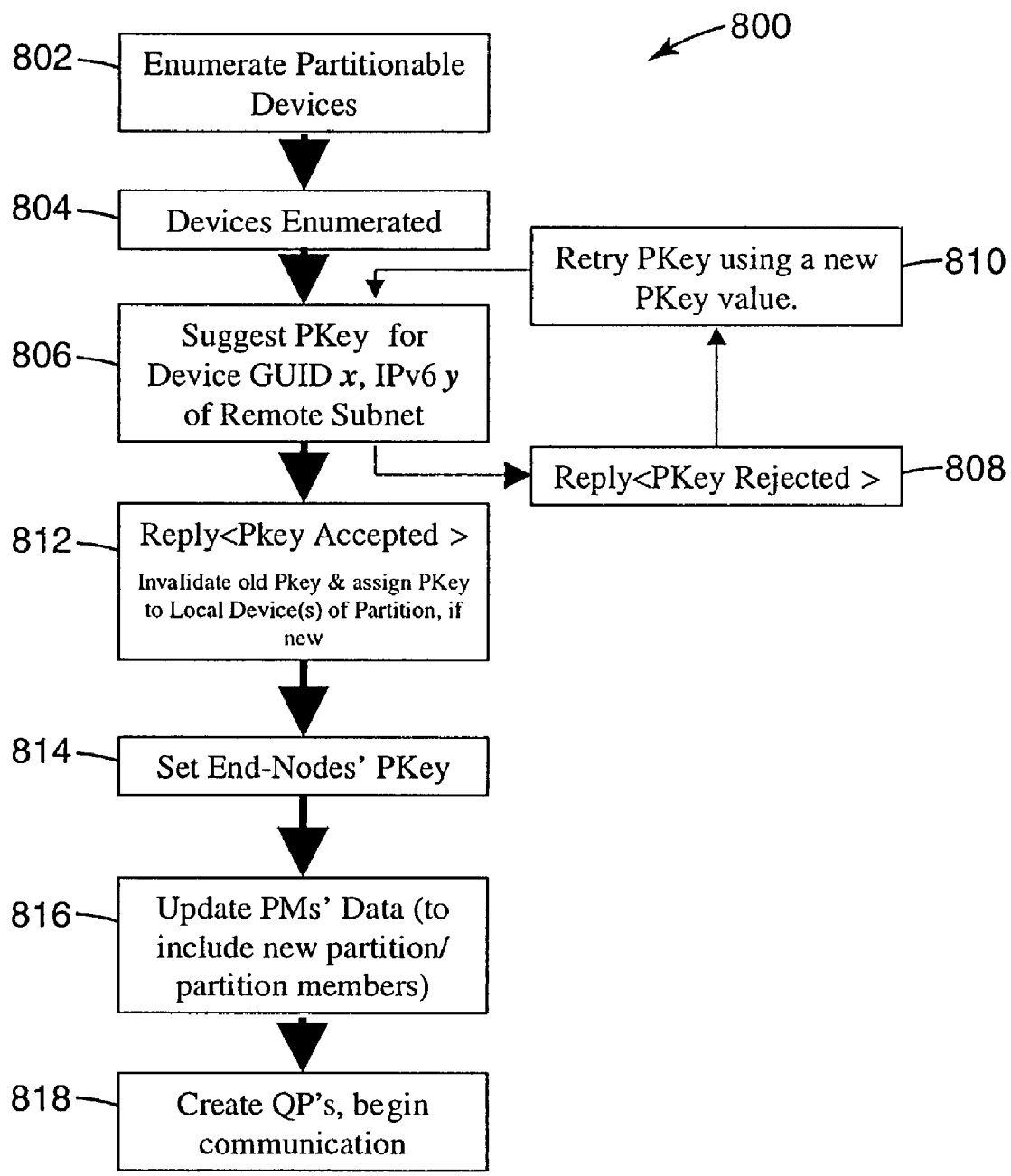
FIG. 15 is a flow diagram of a protocol for adding a new remote endnode to an existing local partition.

An example embodiment of a protocol for adding a new remote endnode to an existing local partition is illustrated generally at 800 in FIG. 15. At step 802, the PMs enumerates partitional devices. At step 804, the devices are enumerated. At step 806, the PM suggests a PKey value for device GUID x, IPv6 y of remote subnet. The PKey value is from the existing subnet-only partition.

At step 808, the suggested PKey is rejected because the PKey value is in use by another partition that includes endnodes in that remote subnet. At step 810, a PKey is retried using a new PKey value and flow is returned to step 806 where the PM suggests the PKey.

At step 812, the PKey is accepted because the PKey value is new to the remote subnet, so the PKey is accepted for addition of the specified endnode. Thus, the old PKey is invalidated, and the accepted PKey is assigned to local devices of the partition that are new to the partition.

At step 814, the endnodes PKey is set. At step 816, the PM's data is updated to include new partition/partition members.

At step 818, QPs are created and communication between partitioned domains can begin.

In an illustrative example partitioning operation, a PM on management domain x may want to add another endnode in management domain y to an existing cross-domain partition x-y. In this case, X's PM simply requests that the endnode specified by GUID x IPv6 y be added to the existing partition that is identified by the PKey that is passed with the request to add the new device. The remote PM may accept or reject this request for reasons of PM policy or due to some resource limitation of the specified endnode. If accepted, however, the remote PM will cause its appropriate agent to write the new PKey value at a specified index in the identified endnode.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A distributed computer system comprising:
   a first subnet including a first group of endnodes, each endnode in the first group of endnodes having a unique destination location identification (DLID) within the first subnet;
   a second subnet including a second group of endnodes, each endnode in the second group of endnodes having a unique DLID within the second subnet;
   a communication fabric physically coupled to the first group of endnodes and the second group of endnodes; and
   a partitioning mechanism associating a first partition key to every DLID in the first subnet for enabling communication between the first group of endnodes over the communication fabric and associating a second partition key to every DLID in the second subnet for enabling communication between the second group of endnodes over the communication fabric, wherein the endnodes each include a partition key table having a partition key and DLIDs pertinent to the partition key.

2. The distributed computer system of claim 1, wherein the endnodes each include non-volatile memory storing the partition key table.

3. The distributed computer system of claim 1, wherein each subnet includes a partition manager providing definition and setup of partitions on the subnet.

4. The distributed computer system of claim 3, wherein at least one subnet includes multiple partition managers.

5. The distributed computer system of claim 3, wherein at least one partition manager spans a plurality of subnets, and each of the plurality of subnets includes a partition manager agent being controlled by the partition manager to manage partitions on the subnet.

6. The distributed computer system of claim 1, wherein each subnet includes a partition manager providing definition and setup of partitions on the subnet, and wherein the partition manager controls the content of the partition key table.

7. The distributed computer system of claim 6, wherein a new partition key value is accepted by an endnode to be placed in the partition key table only when a correct management key is passed with the new partition key value, wherein the management key is employed only for management messages.

8. The distributed computer system of claim 7, wherein the partition manager employs the management key when the partition manager creates partitions by writing partition keys or removing an endnode from a partition by invalidating a partition key.

9. The distributed computer system of claim 1, wherein the partitioning mechanism inserts a partition key associated to a source endnode in a frame sent from the source endnode, stores a partition key at a destination endnode, and compares the partition key in the frame to the stored partition key at the destination endnode.

10. The distributed computer system of claim 9, wherein if the partition key in the frame matches the stored partition key at the destination endnode, the frame is accepted and processed normally.

11. The distributed computer system of claim 9, wherein if the partition key in the frame does not match the stored partition key at the destination endnode, the frame is rejected.

12. The distributed computer system of claim 9, wherein if the partition key in the frame does not match the stored partition key at the destination endnode, an error is returned to the source endnode.

13. The distributed computer system of claim 9, wherein the partition key is stored in a frame header in a frame context area as a frame key value.

14. The distributed computer system of claim 13, wherein the frame key value is obtained by performing a logical operation on the partition key and another type of key value.

15. A method of partitioning endnodes in a distributed computer system, the method comprising:
    defining a first subnet including a first group of endnodes, each endnode in the first group of endnodes having a unique destination location identification (DLID) within the first subnet;
    defining a second subnet including a second group of endnodes, each endnode in the second group of endnodes having a unique DLID within the second subnet;
    physically coupling, with a communication fabric, the first group of endnodes and the second group of endnodes;
    associating a first partition key to every DLID in the first subnet for enabling communication between the first group of endnodes over the communication fabric;
    associating a second partition key to every DLID in the second subnet for enabling communication between the second group of endnodes over the communication fabric;
    establishing, at each endnode, a partition key table having a partition key and DLIDs pertinent to the partition key.

16. The method of claim 15 further comprising:
defining and establishing partitions on each subnet with a partition manager.

17. The method of claim 16 further comprising:
defining and establishing partitions on at least one subnet with multiple partition managers.

18. The method of claim 15 further comprising:
managing partitions on a plurality of subnets via one partition manager which controls a partition manager agent on each of the plurality of subnets.

19. The method of claim 15 further comprising:
defining and establishing partitions on each subnet with a partition manager; and
controlling the content of the partition key table with the partition manager.

20. The method of claim 19 further comprising:
accepting a new partition key value at an endnode to be placed in the partition key table only when a correct management key is passed with the new partition key value, wherein the management key is employed only for management messages.

21. The method of claim 20 further comprising:
creating partitions by writing partition keys with the partition manager employing the management key; and
removing an endnode from a partition by invalidating a partition key with the partition manager employing the management key.

22. The method of claim 15 further comprising:
inserting a partition key associated to a source endnode in a frame sent from the source endnode;
storing a partition key at a destination endnode; and
comparing the partition key in the frame to the stored partition key at the destination endnode.

23. The method of claim 22 further comprising:
accepting the frame and processing the frame normally if the partition key in the frame matches the stored partition key at the destination endnode.

24. The method of claim 22 further comprising:
rejecting the frame if the partition key in the frame does not match the stored partition key at the destination endnode.

25. The method of claim 22 further comprising:
returning an error to the source endnode if the partition key in the frame does not match the stored partition key at the destination endnode.

26. The method of claim 22 further comprising:
storing the partition key in a frame header in a frame context area as a frame key value.

27. The method of claim 26 further comprising:
obtaining the frame key value by performing a logical operation on the partition key and another type of key value.

* * * * *